United States Patent [19]

Nagamune et al.

[11] Patent Number: 5,075,863

[45] Date of Patent: Dec. 24, 1991

[54] DISTANCE MEASURING METHOD AND APPARATUS THEREFOR

[75] Inventors: Akio Nagamune; Koichi Tezuka, both of Tokyo; Yoshiyuki Kanao, Yokohama, all of Japan

[73] Assignee: NKK Corporation, Tokyo, Japan

[21] Appl. No.: 307,891

[22] Filed: Feb. 7, 1989

[30] Foreign Application Priority Data

Feb. 9, 1988 [JP] Japan .................................. 63-26582
Oct. 6, 1988 [JP] Japan ................................. 63-250784

[51] Int. Cl.$^5$ .............................................. G01S 9/00
[52] U.S. Cl. .................................. 364/561; 367/118; 342/130
[58] Field of Search ..................... 364/561, 456, 458; 324/326, 327, 329; 342/145, 130, 131, 22; 367/124, 40, 99, 100, 118, 125

[56] References Cited

U.S. PATENT DOCUMENTS

| | | | |
|---|---|---|---|
| 4,044,356 | 8/1977 | Fournier | 342/145 X |
| 4,157,545 | 6/1979 | O'Farrell | 342/145 X |
| 4,367,473 | 1/1983 | Marin et al. | 364/561 |
| 4,442,513 | 4/1984 | Mead | 367/100 |
| 4,571,697 | 2/1986 | Watanabe | 364/561 |
| 4,768,877 | 9/1988 | Torregrosa et al. | 342/145 X |
| 4,821,215 | 4/1989 | Woodward | 364/561 X |
| 4,933,916 | 6/1990 | May et al. | 367/125 |

FOREIGN PATENT DOCUMENTS

| | | |
|---|---|---|
| 55-44916 | 11/1980 | Japan . |
| 61-57875 | 3/1986 | Japan . |
| 61-129858 | 8/1986 | Japan . |
| 61-217516 | 9/1986 | Japan . |
| 63-021584 | 1/1988 | Japan . |

OTHER PUBLICATIONS

"An Experimental Study of a Pulse Compression Radar Using Random Series", by Nishimoto, SANE 85-25, 1985.
"Subsurface Radar Using Coded Pulse", by Suzuki et al., SANE 87-1, 1987.

Primary Examiner—Joseph L. Dixon
Attorney, Agent, or Firm—Michael N. Meller

[57] ABSTRACT

A distance measuring method and apparatus in which first and second pseudo random signals which are the same in pattern but slightly different in period are generated to obtain a correlation output of the first and second pseudo random signals before transmission thereof as a reference correlation output, and the first pseudo random signal is directly transmitted toward a target or alternatively a carrier wave is modulated by the first pseudo random signal and transmitted toward the target. A correlation output of the signal reflected and received from the target and the second pseudo random signal is detected and the distance to the target is measured from the time interval between the reference correlation output and the received correlation output. Alternatively, the modulated carrier wave reflected and received from the target and the second pseudo random signal are subjected to correlation processing to detect a correlative modulated carrier wave and the correlative modulated carrier wave is subjected to orthogonal detection by a reference carrier wave thereby obtaining a target detection output. Then, the distance to the target is measured from the time interval between the reference correlation output and the target detection output.

12 Claims, 9 Drawing Sheets

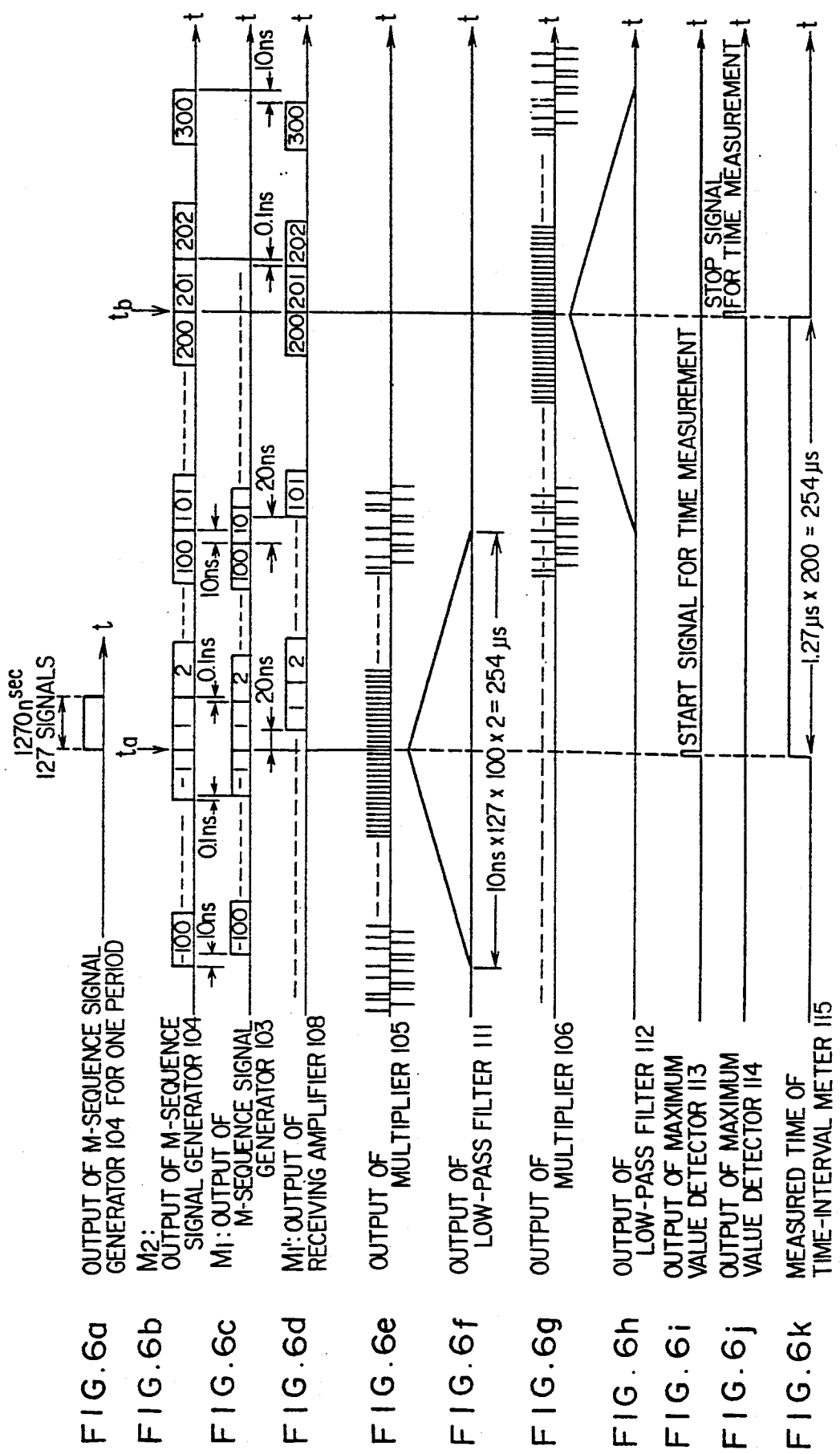

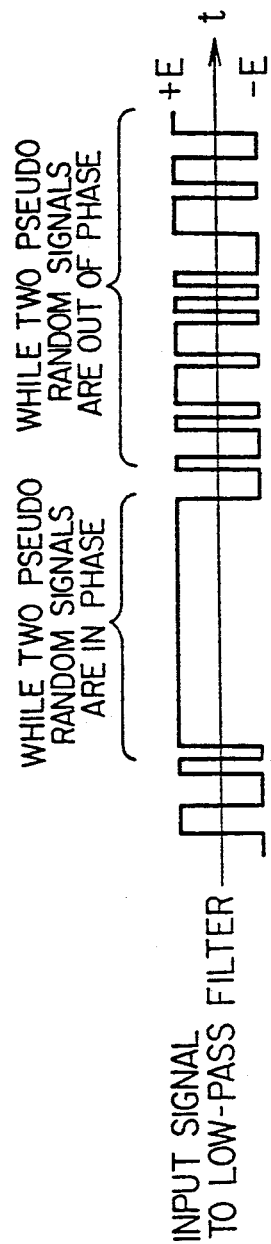
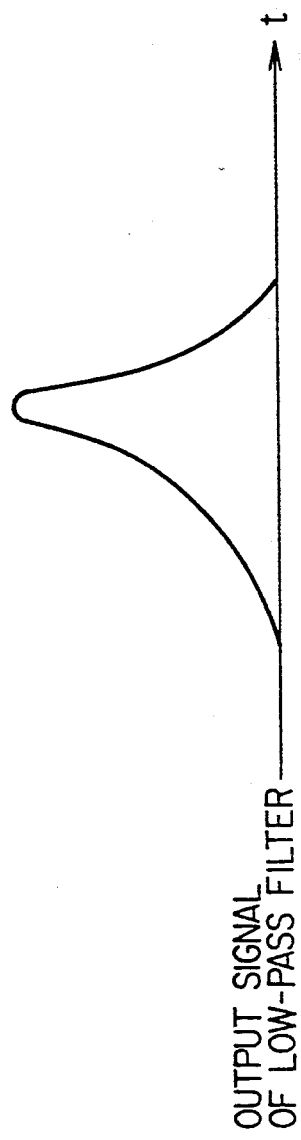
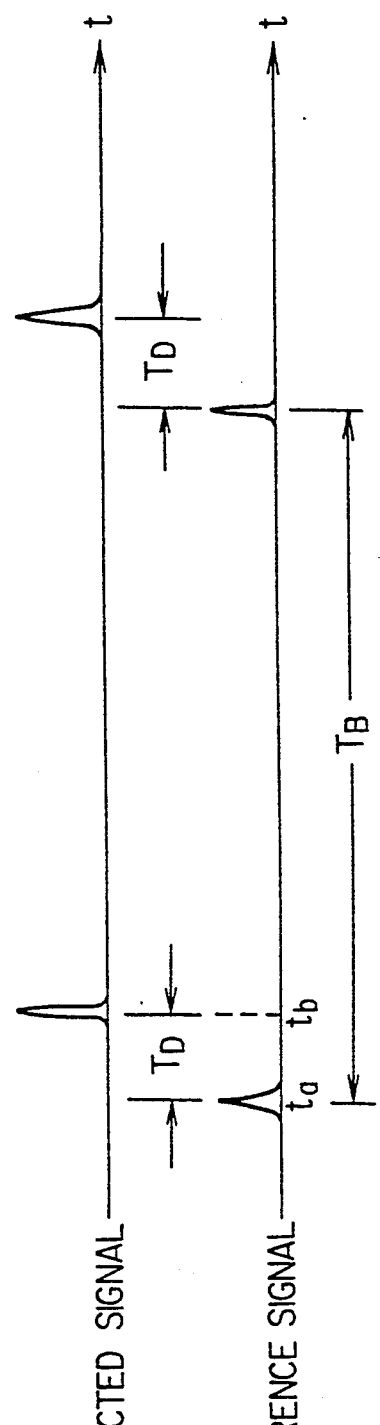

DISTANCE MEASURING METHOD AND APPARATUS THEREFOR

BACKGROUND OF THE INVENTION

1. Field of the Invention

The present invention relates to a method and apparatus for measuring the distance to a target to be detected in the ground, water, snow or the like, the slag level or molten steel level in a melting reduction furnace, converter or the like and the distance to an ordinary target to be detected.

2. Description of the Prior Art

Methods heretofore known or conceived for measuring the distance to a target to be detected in the ground or water in a noncontact manner by using, for example, an electromagnetic wave include one which transmits a monopulse of the order of several ns($10^{-9}$ seconds) as shown, for example, in Japanese Patent Publication No. 55-44916 or another which transmits a pseudo random signal instead of a pulse signal as shown for example, in a publication "Subsurface Radar Using Code Pulse" (Suzuki et al. Institute of Electronics, Information and Communication Engineers, Technical Report SANE 87-1, 1987).

In the method of transmitting a pseudo random signal, such a pseudo random signal as an M-sequence (maximal length sequence) signal or Barker code signal tending to easily produce an autocorrelation output is generated with a given PRF (pulse repetition frequency) so that after its power amplification, the generated signal is transmitted as an electromagnetic wave into the ground or water through a transmitting antenna. The reflected wave from the target to be detected is received through a receiving antenna so that after the conversion from the high-speed received signal to a low-speed received signal by a sampling device, the received output is subjected to pulse compression by a correlator and a detected signal increased in signal amplitude is generated. The time interval between the transmission of the pseudo random signal and the generation of the detected signal from the correlator is equal to the propagation time of the electromagnetic wave going back and forth the distance between the transmitting and receiving antennas and the target to be detected as in the case of the ordinary radar and therefore the distance to the target to be detected can be calculated. Generally, the electromagnetic wave is attenuated more under the ground than in the space and its phase is also changed. Thus, the frequency of the electromagnetic wave used is selected on the basis of the properties of the earth (e.g., the wet soil or dry soil), the detecting distance, etc.

The above-described conventional method and apparatus of the type designed to measure the time between the transmission of a pseudo random signal and the generation of a detected signal from the correlator has the disadvantage of requiring a sampling device in the apparatus, thereby increasing the number of component parts, the scale of the apparatus and the cost. In addition, the correlator requires a tapped delay line as its component part, with the resulting disadvantage of causing a measuring error by a waveform distortion caused by the passing of the received signal through the delay line.

On the other hand, a method of forming a correlator by subjecting the received signal to A-D conversion and performing a digital signal processing has not been put in practice as an economical apparatus due to the limited response speeds of circuit elements and the difficulty of the real time processing.

Also, the conventional level measuring methods for the slag level, molten steel level, etc., in melting reduction furnaces, converters, etc., and position measuring methods for targets to be detected have been divided roughly into two types, i.e., contact type and non-contact type.

The contact-type methods include an electric conduction detection type and an apparatus of this type has been devised as shown, for example, in Japanese Laid-Open Utility Model No. 61-129858 in which at least two electrodes are moved up and down from the top of a furnace and a voltage is applied between the electrodes, thereby detecting the presence of slag by an electric conduction between the electrodes and measuring the slag level by the position of the electrodes.

Also, for performing a temperature distribution measuring method, which is one of the contact type methods, an apparatus has been proposed in which, as shown, for example, in Japanese Laid-Open Patent No. 61-217516, a large number of temperature sensors are embedded at suitable intervals in the lance of a converter and the temperature distribution in the furnace is continuously measured by the temperature sensors, thereby measuring the slag level on the basis of the characteristics of the temperature distribution.

The non-contact type methods include a microwave FMCW (frequency modulated continuous wave) method which has been proposed, for example in Japanese Laid-Open Patent No. 63-21584 or 61-57875 in which a continuous microwave having a frequency of about 10 GHz is frequency modulated and transmitted from an antenna toward a surface to be measured, whereby the beat frequency resulting from the mixing of the transmitting signal and the reflected wave from the surface to be measured is counted and the level of the surface is measured. This method measures the distance from the antenna to the target to be measured on the ground that the required propagation time for the microwave to go back and forth the distance between the antenna and the target to be measured corresponds to the beat frequency.

Also, as a microwave pulse modulation type, there has been known a method in which, as in the case of the ordinary radar to detect a flying target, a microwave having a frequency of about 10 to 20 GHz is pulse modulated and transmitted to measure the distance to a target to be detected on the basis of the fact that the required wave propagation time until the reception of the reflected wave from the target to be detected is proportional to the distance to the target.

In addition, as shown, for example, in a publication "An Experimental Study of a Pulse Compression Radar Using Random Series" (Nishimoto et al. The Institute of Electronics, Information and Communication Engineers, Technical Report SANE 85-25, September 1985), a measuring method employing a radar has been known in which a carrier wave having a frequency of 1 to several tens GHz is modulated by a pseudo random signal, e.g., a maximal length sequence signal, and transmitted to a target to receive the reflected wave from the target, and an optimal matched filter combining a tapped delay line and a weighted adder is used in a demodulation system effect a pulse compression and thereby to improve the resolution and sensitivity.

With the conventional level measuring methods above-mentioned or the methods for measuring the distance to a target, if the methods are of the contact type, they all tend to deteriorate the durability of the portions which contact the slag or molten steel in a furnace or tend to cause damages to those portions. In the case of the electric detection type of conduction, there are disadvantages that an erroneous signal is generated due to an insulation failure of the electric insulating portion caused by the dust or the molten steel splash in a furnace, that a continuous measurement cannot be effected due to the detection by the vertical movement of the electrodes and so on.

Also, in the case of the temperature distribution measuring method of the contact type, the embedding of the temperature sensors in the lance cooled with water deteriorates the response of the temperature sensors due to the heat-transfer characteristic of the lance. There is another disadvantage that when increasing the number of temperature sensors for the purpose of improving the measuring accuracy, there are many restrictions to the wiring of the sensors from the spatial and temperature point of view.

In the case of the microwave FMCW method of the non-contact type, since the inside space of the furnace is limited and the wave reflectors such as the lance and the charging hole of the furnace are present within the space, when a microwave is transmitted into the furnace, undesired reflected waves, including multipath reflected waves, are generated with the resulting disadvantage of making it difficult to eliminate the undesired reflected signals and thereby accurately measure only the reflected signal from the intended target to be detected.

Also, in the case of the microwave pulse modulation method of the non-contact type, there are disadvantages. For example, since usually the signal reception is effected after the transmission of the pulse modulated wave has been completed, considering the propagation velocity of the microwave, it is necessary for a short distance measuring radar to transmit a microwave having a relatively large peak transmission power and modulated by a pulse of a very short time width and to measure a small time required until the reception of a received signal reflected from a short distance target and it is difficult to technically realize these operations. This makes the method unsuitable for use in short distance measurements such as the level measurement in a furnace and so on.

Further, in the case of the microwave pulse compression radar method of the non-contact type, there are disadvantages that while, after receipt the signal, the pulse width is compressed increase the received power and thereby to improve the resolution and sensitivity, the construction of the optimal matched filter combining the tapped delay line and the weighted adder required in the demodulation system is complicated. In particular, if a pseudo random signal length is increased (e.g., $2^5$ to $2^{20}$) so as to enhance the sensitivity, the apparatus is complicated in construction and increased in size, thereby increasing the cost. There is another disadvantage of requiring complicated operations such as adjustments of the delay times among the taps and adjustment for the correction of a waveform distortion during the propagation in the delay line. Still another disadvantage is that where the function of the matched filter is performed by a digital signal processing, a high-speed A-D converter and a high-speed computing unit are required, thereby similarly complicating the construction of the apparatus, increasing its size and increasing the cost.

SUMMARY OF THE INVENTION

It is a first object of the present invention to provide a distance measuring method and apparatus which overcome the foregoing deficiencies of the conventional methods and apparatus for measuring the distance to a target to be detected in the ground or water and also are capable of detecting the distance to such target to be detected with a simple construction.

It is a second object of the invention to provide a distance measuring method and apparatus which overcome the foregoing deficiencies of the conventional methods and apparatus for measuring the slag level or molten steel level in a blast furnace, converter or the like and also are capable of accurately measuring a level position such as the slag level or molten steel level or the distance to a target to be detected from a short distance continuously in a non-contact manner by the use of an inexpensive apparatus without being affected by environmental conditions such as the presence of dust.

To accomplish the first object, in accordance with the invention there is thus provided a distance measuring method comprising the steps of generating first and second pseudo random signals which are the same in pattern but slightly different only in frequency, branching the first pseudo random signal in two parts such that its one part is transmitted toward a target to be detected and the other part is multiplied by the second pseudo random signal to calculate a first product value, calculating a second product value of the received signal obtained by receiving the reflected signal from the target and the second pseudo random signal, and measuring the time difference between the time sequence pattern of the first product value and the time sequence pattern of the second product value, thereby measuring the distance to the target.

To accomplish the first object, in accordance with the invention there is provided a distance measuring apparatus comprising first and second pseudo random signal generating means for generating first and second pseudo random signals which are the same in pattern but slightly different only in frequency, transmitting means for transmitting the output of the first pseudo random signal generating means as a transmitted signal to a target to be detected, receiving means for receiving a reflected signal from the target to obtain a received signal, a first multiplier for multiplying the outputs of the first and second pseudo random signal generating means, a second multiplier for multiplying the output of the receiving means and the output of the second pseudo random signal generating means, and means for measuring the time difference between the time sequence patterns of the outputs from the first and second multipliers.

To accomplish the second object, in accordance with the invention there is provided a distance measuring method comprising generating a first pseudo random signal and a second pseudo random signal which is the same in pattern but slightly different in frequency from the first pseudo random signal, multiplying the first and second pseudo random signals to generate a time sequence pattern of a product value, modulating a carrier wave by the first pseudo random signal and transmitting the modulated carrier wave toward a target to be detected, multiplying a received signal consisting of a received reflected signal from the target and the second pseudo random signal, detecting the correlative modulated carrier wave to generate a time sequence pattern of the detected signal, and measuring the time difference between the product time sequence pattern, and the detected signal time sequence pattern thereby measuring the distance to the target.

To accomplish the second object, in accordance with the invention there is provided a distance measuring apparatus comprising first pseudo random signal generating means, second pseudo random signal generating means for generating an output signal which is the same in pattern but slightly different in frequency from the output signal of the first pseudo random signal generating means, a first multiplier for multiplying the output of the first pseudo random signal generating means and the output of the second pseudo random signal generating means, carrier wave generating means, transmitting means for transmitting a signal obtained by modulating the output signal of the carrier wave generating means by the output of the first pseudo random signal generating means as a transmitted signal to a target to be detected, receiving means for receiving a reflected signal from the target to obtain a received signal, a second multiplier for multiplying the output of the receiving means and the output of the second pseudo random signal generating means, detecting means for detecting the carrier wave generated from the second multiplier, and means for measuring the time difference between the time sequence pattern of the detected signal generated from the detecting means and the time sequence pattern of the product value generated from the first multiplier.

In accordance with either of the first and second aspects of the invention, by virtue of the fact that the measured time between a detected signal from a target to be detected and a reference signal is greatly expanded on a time base by the use of a method so designed that a first pseudo random signal is directly transmitted to a target to be detected or a carrier wave phase modulated by the first pseudo random signal is transmitted to the target to be detected and a received signal reflected from the target is subjected to a correlation processing by a second pseudo random signal which is the same in pattern and close in frequency to the first pseudo random signal, the measurement of time is made possible directly by use of a low-speed signal. As a result, the need for the sampling device required in the conventional real time high-speed signal processing is eliminated and the apparatus can be constructed with low-speed circuit elements with the resulting effect of reducing the size and cost of the apparatus.

Also, in the measurement of time proportional to the distance to be measured, the measurement is made in terms of a time greatly expanded as compared with the real time so that not only the distance to a target can be measured accurately at a short distance, but also the desired reflected signal from the intended target and the undesired signals from outside the objective range can be clearly discriminated and separated from each other on the time base for the generation of detected signal. Thus, when measuring the level within a furnace, even in such a measuring environment as the limited space in the furnace where undesired reflected waves tend to occur, there is the effect of eliminating the undesired reflected waves and stably measuring the level.

BRIEF DESCRIPTION OF THE DRAWINGS

FIGS. 6A-6K show a plurality of signal wave-forms useful for explaining the operation of the embodiment of FIG. 3.

FIGS. 11A-11D a plurality of signal waveforms useful for explaining the operation of the second embodiment.

DETAILED DESCRIPTION OF THE PREFERRED EMBODIMENTS

While the present invention and the conventional techniques have a common feature with respect to the use of pseudo random signals, the conventional techniques are methods of utilizing a single pseudo random signal to measure the real propagation time of an electromagnetic wave. On the contrary, the present invention is directed to a method whereby, using two pseudo random signals which are the same in pattern by slightly different in frequency from each other, the correlation output between the two signals before the transmission and after the reception is detected, thereby considerably expanding the measured time as compared with the real time. Therefore, the conventional technique will be explained first with a view to clarifying the differences between the present invention and the conventional techniques.

Figure 1:
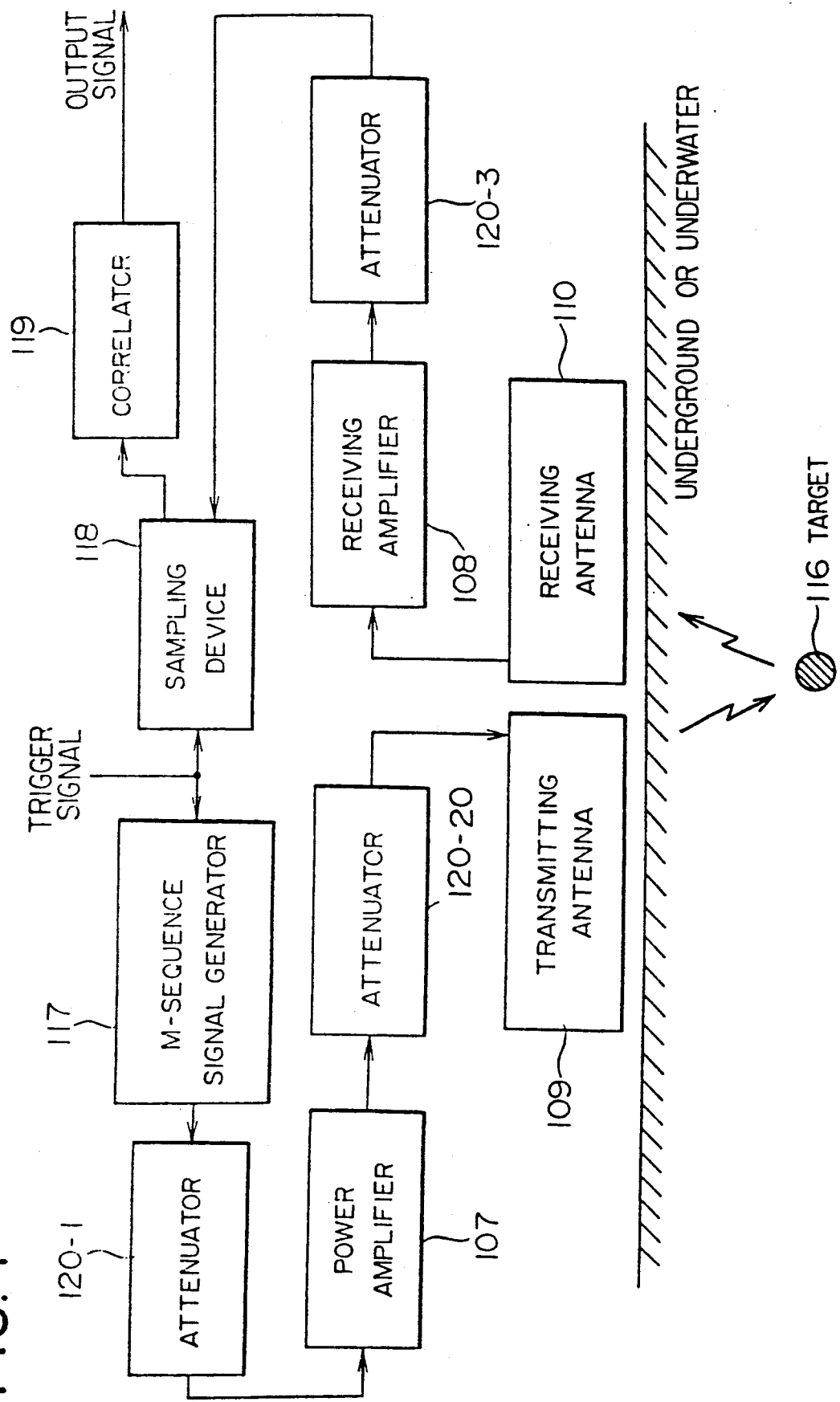
FIG. 1 is a block diagram of a conventional underwater or under-ground searching radar system which transmits a pseudo random signal.

Referring to FIG. 1, there is illustrated a block diagram of a conventional underground or underwater searching radar system which transmits a pseudo random signal. In FIG. 1, reference numeral 107 designates a power amplifier, 108 a receiving amplifier, 109 a transmitting antenna, 110 a receiving antenna, 116 a target in the ground or in the water, 117 a maximal length sequence signal generator, 118 a sampling device, 119 a correlator, and 120-1, 120-2 and 120-3 attenuators.

Figure 2:
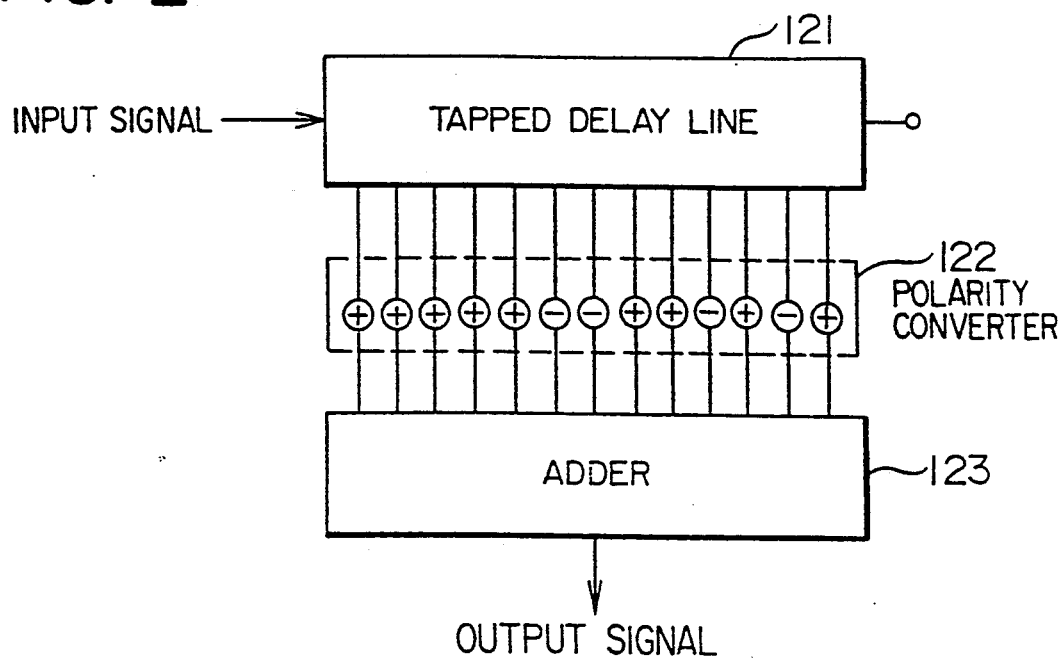
FIG. 2 is a block diagram of the correlator of FIG. 1.

FIG. 2 is a block diagram of the correlator, wherein numeral 121 designates a tapped delay line, 122 a polarity converter, and 123 an adder.

The operation of the apparatus shown in FIGS. 1 and 2 will now be described. Firstly, a trigger signal is applied at a given repetition frequency to the maximal length sequence signal generator 117. The maximal length sequence signal generator 117 is used as a pseudo random signal generating means and its code has a given periodicity. Each time a trigger signal is applied, the maximal length sequence signal generator 117 generates a maximal length sequence signal for one period. The output signal of the maximal length sequence signal generator 117 is radiated as an electromagnetic wave into the ground or water from the transmitting antenna 109 through the attenuator 120-1, the power amplifier 107 and the attenuator 120-2. The radiated electromagnetic wave is reflected from the target 116 to be detected in the ground or water. The output signal from the receiving antenna 110 is applied to the sampling device 118 through the receiving amplifier 108 and the attenuator 120-3. The sampling device 118 has a function of converting a high-speed signal to a low-speed signal. Assuming N received signals of the same waveform are obtained in response to N trigger signals, this received signal is divided in time by N into signals $x_1$, $x_2$, ... $x_N$. Thus, only the signal $x_1$ is sampled from the first received signal and only the signal $x_2$ is sampled from the second received signal. Such sampling operation is repeated so that a single received signal $x_1$, $x_2$, ... $x_n$ is reproduced from N received signals. In this way, the sampling device 118 converts a high-speed received signal to a low-speed received signal and its output is supplied to the correlator 119. The correlator 119 has a function of determining a correlation between the input signal and the preliminarily stored maximal length sequence signal and FIG. 2 shows its detailed block diagram. The input signal is introduced into the tapped delay line 121 and each signal corresponding to its delay time is outputted from each of the taps. The output signals from the taps of the tapped delay line 121 are applied to the polarity converter 122. In the polarity converter 122, the mark "+" indicates that no polarity conversion is effected and "−" indicates that a polarity conversion is effected. The output signals are applied in parallel to the adder 123 which in turn adds the parallel input signals to obtain the summation. As a result, the received signal is compressed in time but increased in amplitude and it is then output from the correlator 119. In this technique, the use of a pseudo random signal has the purpose of subjecting the received signal to pulse compression and the measurement of distance is made in terms of the propagation time required for the electromagnetic wave to travel back and forth the distance between the transmitting and receiving antennas and the target to be detected, as in ordinary radar.

Next, the present invention will be described. A distance measuring method according to the invention is a method comprising setting a first pseudo random signal used for transmission and reception from a target to be detected and a second pseudo random signal which is used as a reference signal and is the same in pattern but slightly different in frequency from the first pseudo random signal, determining the time of detection of the maximum correlation value between the second pseudo random signal and the transmitted first pseudo random signal and the time of detection of the maximum correlation value between the second pseudo random signal and the received first pseudo random signal and measuring the interval of time between both of the maximum correlation value detection times, thereby measuring the time proportional to the distance to the target to be detected. This measured time is in the form of a greatly expanded time as compared with the real time required for the propagation of the electromagnetic wave in the conventional method, thereby making possible the measurement of time directly by means of a low-speed signal.

A distance measuring apparatus according to the first embodiment of the invention employs the above-mentioned measuring method so that the sampling device heretofore required for high-speed signal processing is no longer necessary and the apparatus is composed of low-speed circuit elements. In addition, there is no need for the tapped delay line which causes a measuring error due to a wave-form distortion.

Also, the apparatus according to the first embodiment includes, for the purpose of detecting the maximum correlation values between the pseudo random signals, a pair of multipliers for detecting correlation values, means for generating respective pulses when the output of each of the pair of multipliers attains a maximum value, and means for measuring the time interval between the generated two pulses, thereby making it possible to make very accurate time measurement.

In this embodiment, each of the two pseudo signal generating means is composed of a clock synchronization-type pseudo random generator and the two generators are identical in construction except that their driving clock signal frequencies are slightly different from each other. Therefore, the two pseudo random signal generating means can be realized by means of common circuits.

The operation of the first embodiment can be formulated as follows.

Assume that $f_1$ represents the clock frequency of the first pseudo random signal and $f_2$ represents the clock frequency of the second pseudo random signal and that the patterns of these pseudo random signals are the same. Here, it is assumed that $f_1 > f_2$.

If $T_B$ represents the period at which a reference signal produced by determining a correlation between the transmitted first pseudo random signal and the second pseudo random signal attains its maximum value, the difference between the wave numbers of the first and second pseudo random signals which are contained in the period $T_B$ corresponds to the wave number N of one period.

In other words, $T_B \cdot f_1 = T_B \cdot f_2 + N$

By simplifying the above equation, the period $T_B$ is given as:

$$T_B = N/(f_1 - f_2) \qquad (1)$$

In other words, the period $T_B$ at which the reference signal attains the maximum value is increased with a decrease in the difference between the two clock frequencies.

Then, if $T_D$ represents the time difference between the time that the detected signal produced by determining the correlation between the signal resulting from the first pseudo random signal transmitted, reflected from a target to be detected and received again after the expiration of a propagation time $\tau$ and the second pseudo random signal and the time that the reference signal attains the maximum value, the wave number of the second pseudo random signal generated during the time difference $T_D$ is smaller than the wave number of the first pseudo random signal generated during $T_D$ by the wave number of the first pseudo random signal generated during the time $\tau$ and therefore the following equation holds:

$$T_D \cdot f_2 = T_D \cdot f_1 - \tau \cdot f_1$$

Simplifying the above equation, the time difference $T_D$ is as follows:

$$T_D = \tau \cdot f_1/(f_1-f_2) \quad (2)$$

In other words, the propagation time $\tau$ is expanded in time by a factor of $f_1/(f_1-f_2)$ or it is measured in terms of the low-speed $T_D$. Due to this expansion of the measured time, the distance measuring method and apparatus according to the invention can be considered essentially suited for short distance measuring purposes.

If v represents the propagation velocity and x represents the distance to a target to be detected, the propagation time $\tau$ is given by the following:

$$\tau = 2x/v$$

and therefore the following equation (3) is obtained from equation (2):

$$x = \frac{f_1-f_2}{2f_1} \cdot v \cdot T_D \quad (3)$$

By measuring the time difference $T_D$, it is possible to measure the distance x from equation (3).

Figure 3:
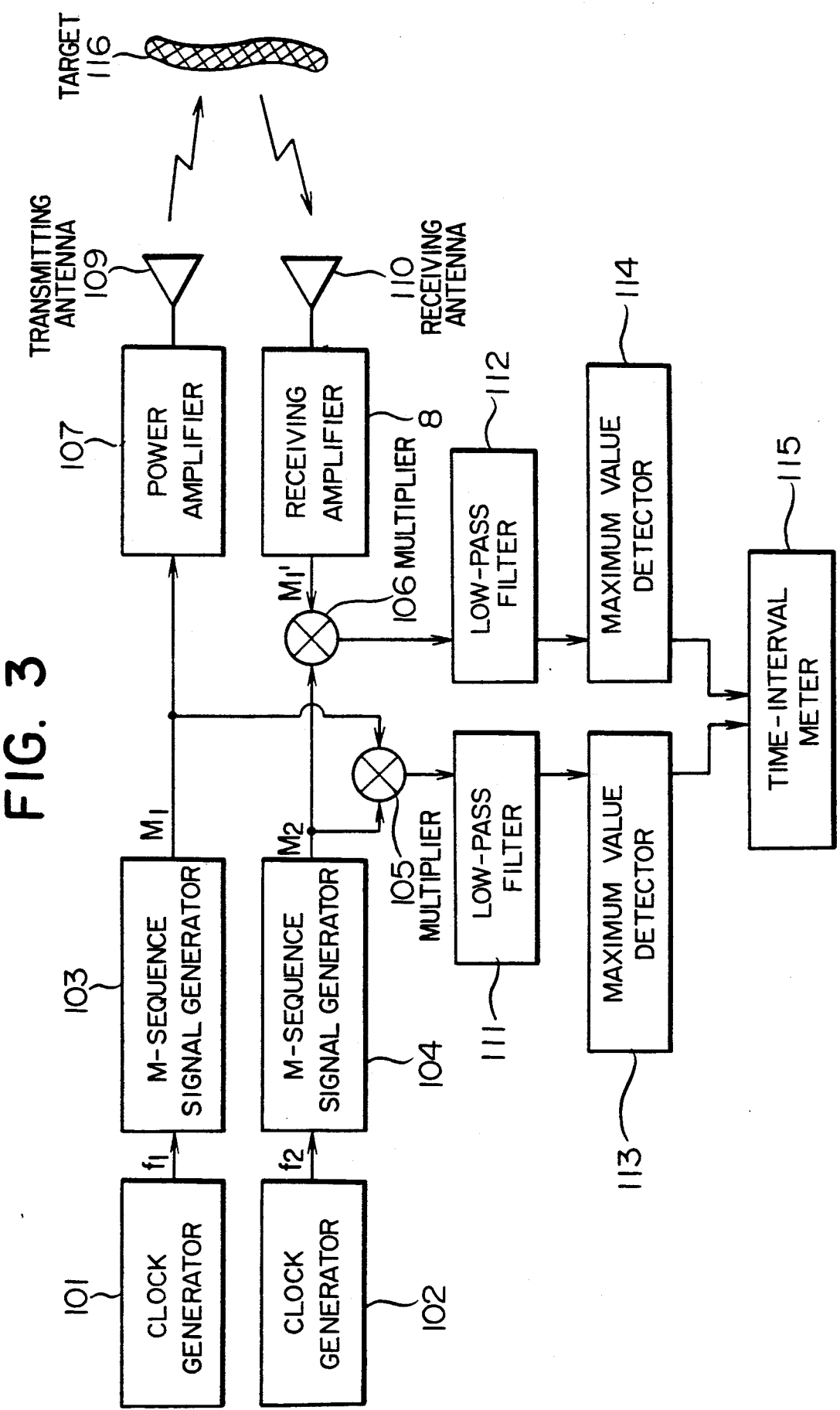
FIG. 3 is a block diagram showing a first embodiment of the invention.

Referring now to the block diagram of FIG. 3 showing the first embodiment of the invention, numerals 101 and 102 designate clock generators, 103 and 104 maximal length sequence signal generators, 105 and 106 multipliers, 107 a power amplifier, 108 a receiving amplifier, 109 a transmitting antenna, 110 a receiving antenna, 111 and 112 low-pass filters, 113 and 114 maximum value detectors, 115 a time-interval meter, and 116 a target to be detected.

Also, first pseudo random signal generating means is formed by the clock generator 101 and the maximal length sequence signal generator 103.

The second pseudo random signal generating means is formed by the clock generator 102 and the maximal length sequence signal generator 104.

The power amplifier 107 and the transmitting antenna 109 form means for transmitting the output of the first pseudo random signal generating means to the target 116.

The receiving antenna 110 and the receiving amplifier 108 form means for receiving the reflected signal from the target 116 to obtain the received signal.

The time difference measuring means is formed by the low-pass filters 111 and 112, the maximum value detectors 113 and 114 and the time-interval meter 115.

Figure 4:
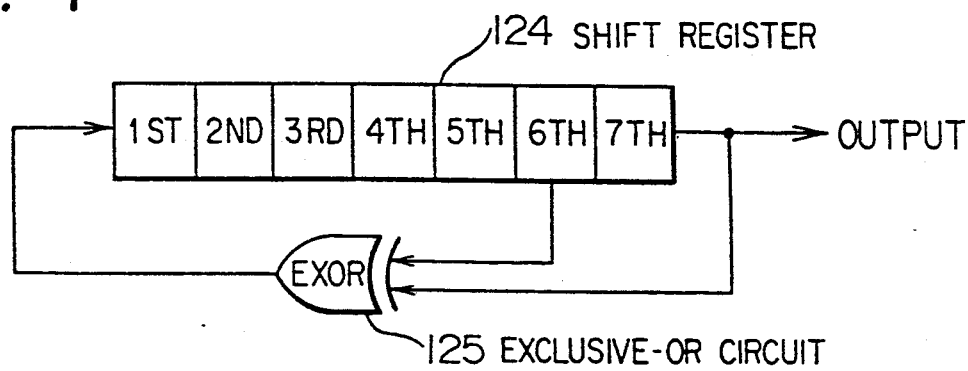
FIG. 4 is a diagram showing the construction of the 7-bit maximal length sequence signal generator of FIG. 3.

Referring to FIG. 4 showing the construction of a 7-bit maximal length sequence signal generator, numeral 124 designates a shift register of a 7-stage configuration, and 125 an exclusive-OR circuit.

Figure 5:
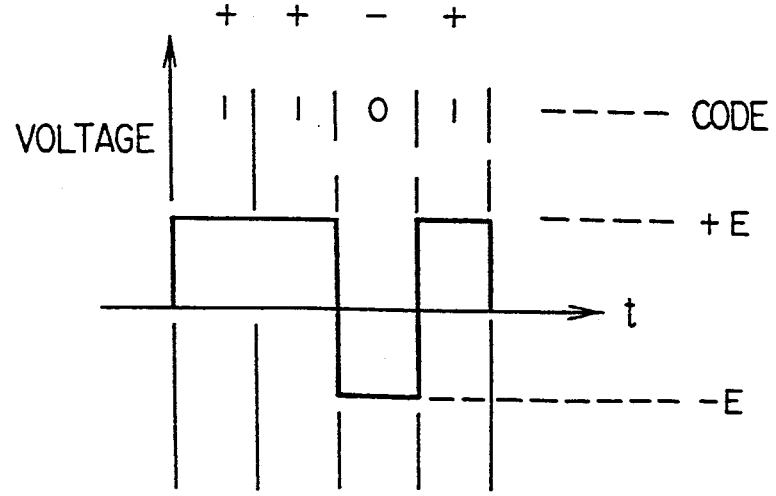
FIG. 5 is an output waveform diagram of the maximal length sequence signal generator.

FIG. 5 is a diagram at the output waveform of the maximal length sequence signal generator.

FIG. 6 shows a plurality of waveforms useful for explaining the operation of the embodiment of FIG. 3.

The operation of the embodiment of FIG. 3 will now be described with reference to FIGS. 4 to 6. The clock generator 101 generates a clock signal of a frequency $f_1$ and the clock generator 102 generates a clock signal of a frequency $f_2$. One feature of this invention resides in that the difference between frequency $f_1$ of the first clock signal and frequency $f_2$ of the second clock signal is very small. A description will now be made of a case in which $f_1=100.004$ MHz, $f_2=99.996$ MHz and the difference $f_1-f_2=8$ KHz. The clock signals of frequency $f_1$ generated from the clock generator 101 are applied as the synchronizing signals to generate the maximal length sequence signal to the maximal length sequence signal generator 103, and the clock signals of the frequency $f_2$ generated from the clock generator 102 are similarly applied to the maximal length sequence signal generator 104. The maximal length sequence signal generators 103 and 104 are used as one form of the pseudo random signal generating means and Baker code generators may, for example, be used in place of the maximal sequence length signal generators. In the case of this embodiment, a 7-bit maximal length sequence code is used and its structure is shown in FIG. 4.

In other words, the shift register 124 composed of seven flip-flops synchronized with clock signals is provided so that the output signals of the sixth-stage and seventh-stage flip-flops are applied to the first-stage flip-flop through the exclusive-OR circuit 125 and the clock signals which are not shown are supplied to the respective flip-flop stages, thereby generating an output signal from the seventh-stage flip-flop to generate a maximal length sequence code synchronized with the clock signals. The thus generated maximal length sequence code is a periodic recurrent code composed of a combination of bits "1" and "0" or "+" and (−), and in this embodiment the bits "1" and "0" respectively generate positive-voltage (+E) and negative-voltage (−E) signals as shown in FIG. 5. As regards the period of the maximal length sequence signal which is generated recurrently, since the signal comprises 7 bits, one period is completed upon the generation of $N=2^7-1=127$ signals. Then, the same signals as the preceding period are generated starting at the next or 128th signal and this period recurs repeatedly. Generally, while the maximal length sequence signal is a random signal when considered partially, it is used as a signal utilizing the autocorrelation function and the signal is used in a pulse compression radar in the description of the conventional apparatus.

The maximal length sequence signal generators 103 and 104 are composed of the identical circuits for generating the same 7-bit maximal length sequence signals and the only difference is that the frequencies $f_1$ and $f_2$ of the inputted clock signals are slightly different from each other. In addition, a shift register having a clock frequency of about 100 MHz can, for example, be realized easily with ECL (emitter coupled logic) elements. Each of the maximal length sequence signal generators 103 and 104 recurrently outputs a maximal length sequence signal $M_1$ or $M_2$ composed of 127 voltages $+E$ and $-E$ for each period. However, since the frequencies of the input clock signals differ slightly from each other, the respective lengths of the periods differ slightly between the maximal length sequence signals $M_1$ and $M_2$. The periods of the maximal length sequence signals $M_1$ and $M_2$ can be determined as follows: the period of $M_1=127 \times 1/100.004$ MHz $\approx 1269.9492$ ns and the period of $M_2=127 \times 1/99.996$ MHz $\approx 1270.0508$ ns. In other words, while the periods of the maximal length sequence signals $M_1$ and $M_2$ are about 1270 ns ($10^{-9}$ seconds), there is the time difference of about 0.1 ns between the two periods. Thus, if the maximal length sequence signals $M_1$ and $M_2$ are recurrently generated so that the patterns of the two signals $M_1$ and $M_2$ coincide at a certain time $t_a$, a deviation of 0.1 ns is caused between the two signals after the expiration of the time of one period and a deviation of 10 ns is caused between the two signals after the expiration of 100 periods. Since the maximal length sequence signal generates 127 signals for one period of 1270 ns and thus the duration time of one signal is 10 ns. Thus, the occurrence of a deviation of 10 ns between the maximal length sequence signals $M_1$ and $M_2$ means the occurrence of a deviation corresponding to one maximal length sequence signal. These timings are shown in FIG. 6. More specifically, FIG. 6(a) shows that the output of the reference maximal length sequence signal generator 104 for one period includes 127 signals and its period is 1270 ns and FIG. 6(b) shows the output $M_2$ of the maximal length sequence signal generator 104 is recurrently generated from the $-100$th to 300th periods. Also, FIG. 6(c) shows that the output $M_1$ from the maximal lenght sequence signal generator 103 is short by 0.1 ns for one period and 10 ns for 100 periods as compared with the output $M_2$ from the maximal length sequence signal generator 104 and that at the time $t_a$, the maximal length sequence signals $M_1$ and $M_2$ come into synchronization, thus causing the patterns of the two signals to coincide. Also, after the patterns of the maximal length sequence signals $M_1$ and $M_2$ have coincided at time $t_a$, deviation is again increased gradually so that the patterns of the two signals coincide again at the expiration of a given time $T_B$. When the maximal length sequence signals $M_1$ and $M_2$ come into synchronism so that the patterns of the two signals coincide, the correlation output of the two signals becomes maximum and the calculation of this correlation is performed by the multiplier 105, which will be described later. Also, in the case of this embodiment, the period $T_B$ during which the maximum correlation output is obtained can be computed as $T_B = 15.875$ ms by substituting the wave number $N = 127$ for one period of the maximal length sequence signals, the frequency $f_1 = 100.004$ MHz and $f_2 = 99.996$ MHz into equation (1).

The maximal length sequence signals $M_1$ and $M_2$ respectively generated from the maximal length sequence signal generators 103 and 104 are each branched in two so that one signal is applied to the multiplier 105. The multipliers 105 and 106 are each composed, for example, of a wide-band double balanced mixer (DBM) and the multiplication for determining the correlation output of the two maximal length sequence signals is performed. The maximal length sequence signal comprises positive or negative voltage signals as mentioned previously so that the multiplication result of the same signs results in a positive voltage and the multiplication result of the different signs results in a negative voltage, thereby generating positive or negative voltage signals at the output of the multipliers 105 and 106, respectively. Thus, the output signal of the multiplier 105 consists of a dc positive voltage or a pulse of positive voltage at around the time $t_a$ at which the patterns of the maximal length sequence signals $M_1$ and $M_2$ conicide. However, the periods of the maximal length sequence signals $M_1$ and $M_2$ differ slightly so that a deviation of 0.1 ns occurs between the two signals each time one period expires. Thus, at the expiration of 100 periods from the time $t_a$, there is a deviation of 10 ns or a deviation corresponding to one signal interval between the maximal length sequence signals $M_1$ and $M_2$. In this condition, there is no longer any correlation between the signals and a train of positive and negative pulse signals is randomly generated at the output of the multiplier 105. This output waveform of the multiplier 105 is shown in FIG. 6(e). The output signal of the multiplier 105 is supplied to the low-pass filter 111 which in turn converts the signal to a DC voltage. Each of the low-pass filters 111 and 112 has a cutoff frequency $f_c$ and it serves the function of attenuating the input components which are higher frequency components than the cutoff frequency $f_c$ and smoothing the input signal. The output signal of the low-pass filter 111 attains the maximum value at the time $t_a$ at which the patterns of the maximal length sequence signals $M_1$ and $M_2$ coincide and it attains the minimum value at the time at which the maximal length sequence signal $M_2$ is shifted from the time $t_a$ by about 100 periods, that is, at times of $t_a \pm 127$ $\mu$s. Then, the output signal of the low-pass filter 111 takes the form of a triangular voltage signal which linearly decreases from the maximum value or the apex to the minimum value on both sides. This output waveform of the low-pass filter 111 is shown in of FIG. 6(f). Also, as mentioned previously, this triangular voltage signal is generated at the period $T_B = 15.875$ ms at which period the two maximal length sequence signals come into synchronization. The output signal from the low-pass filter 111 is applied to the maximum value detector 113. Each of the maximum value detectors 113 and 114 has a function of detecting the maximum value of the triangular voltage signal applied from the low-pass filter 113 or 114 or the voltage at the apex of the triangle and generating a single pulse signal at the time of detection of the maximum voltage value. The method of detecting the time of generation of the maximum voltage may for example be one comprising the steps of providing an A/D converter and a digital data comparator, successively converting an input triangular analog signal by high-speed sampling signals, comparing at all times the digital data obtained by the preceding sampling signal and the digital data obtained by the current sampling signal as to relative magnitude using the digital data comparator and detecting the time of change of the input signal from the increase to the decrease with respect to time. The same function can be realized by successively comparing the similarly sampled analog signals. Where there is the danger of small peaks appearing due to noise or the like, it suffices to establish a threshold value so that the detection of the peak value is performed only on those signals exceeding the threshold value. The maximum value detector 113 supplies a pulse output as a start signal for time measurement to the time-interval meter 115 at the maximum value detecting time $t_a$ of the input signal. When the start signal for time measurement or a reference time is applied from the maximum value detector 113, the time-interval meter 115 starts the measurement of time. This condition is shown in FIGS. 6(i) and 6(k). Of the maximal length sequence signal $M_1$ generated from the maximal length sequence signal generator 103 and then branched off in two, the other maximal length sequence signal $M_1$ is applied to the power amplifier 107 so that the output power is amplified, for example, to about 20 mW. The maximal length sequence output signal from the power amplifier 107 is supplied to the transmitting antenna 109. The transmitting antenna 109 radiates the electromagnetic wave of the maximal length sequence signal into a propagation medium. The radiated electromagnetic wave is reflected by the target 116 whose conductivity or dielectric constant is different from the value of the propagation medium and it is then detected by the receiving antenna 110. The reflected signal thus detected by the receiving antenna 110 is applied to the receiving amplifier 108 so that the amplification and waveform reshaping of the signal are performed. The output signal $M_1'$ of the receiving amplifier 108 is the same as the signal delayed by the propagation time of the maximal length sequence signal $M_1$ radiated as an electromagnetic wave from the transmitting antenna 109, going back and forth the distance to the target 116 and then reaching the receiving antenna 110.

Strictly speaking, while fixed delay times are involved in the power amplifier 107, the signal amplifier 108, etc., these fixed delay times can be eliminated from the measurement point of view by, for example eliminating them at the stage of the processing for measurement or by supplying the output signal $M_1$ from the maximal length sequence signal generator 103 through a delay circuit having an equal delay time. In this way, the maximal length sequence signal $M_1'$ having a delay time proportional to the distance from the transmitting and receiving antennas 109 and 110 to the target 116, is generated from the receiving amplifier 108 and supplied to one input of the multiplier 106. Assume that the target 116 is present in the air at a distance of 3 meters from the transmitting and receiving antennas 109 and 110, respectively. Since the electromagnetic wave required 20 ns to propagate in the air and go back and forth the distance of 3 meters, the maximal length sequence signal $M_1'$ generated from the receiving amplifier 108 is delayed by 20 ns from the maximal length sequence signal $M_1$ generated from the maximal length sequence signal generator 103. This condition is shown in FIG. 6($d$). Also, of the maximal length sequence signal $M_2$ generated from the maximal length sequence signal generator 104 and branched off in two, the other maximal length sequence signal $M_2$ is supplied to the other input of the multiplier 106. In like manner as in the multiplier 105, the multiplication of the maximal length sequence signals $M_1'$ and $M_2$ is performed. The multiplier 106 supplies the multiplication result of the maximal length sequence signals $M_1'$ and $M_2$ to the low-pass filter 112. The low-pass filter 112 generates a triangular voltage signal whose apex corresponds to the time at which the patterns of the two signals $M_1'$ and $M_1$ coincide and this voltage signal is supplied to the maximum value detector 114. The foregoing operation is identical with the operation described in connection with the multiplier 105 and the low-pass filter 111. The only difference is the time instant at which the patterns of the maximal length sequence signals $M_1'$ and $M_2$ coincide. Since the maximal length sequence signal $M_1'$ is delayed by 20 ns from the maximal length sequence signal $M_1$ and since the period of the maximal length sequence signal $M_1'$ is shorter, the patterns of the two signals $M_1'$ and $M_1$ coincide at a time $t_b$ which is delayed from the time $t_a$ by 200 periods of the maximal length sequence signal $M_2$. Since one period of the maximal length sequence signal $M_2$ is 1.27 $\mu$s, 200 periods amounts to 1.27 $\mu$s $\times$ 200 = 254 $\mu$s and the time $t_b$ lags the time $t_a$ by 254 $\mu$s. The maximum value detector 114 generates a pulse output when detecting the maximum value of the applied triangular voltage and of course this pulse output is generated at the time $t_b$. The operation of maximum value detector 114 is the same as that of maximum value detector 113 and at this time the generated pulse output is supplied as a stop signal for time measurment to the time-interval meter 115. The time-interval meter 115 measures the time interval between the time $t_a$ at which the start signal for time measurement is applied and the time $t_b$ at which the stop signal for time measurement is applied. In this embodiment, 254 $\mu$s is obtained as the result of the measurement. The time measuring method may, for example, be an ordinary method of providing a time gate from the measurement starting time to the stop time and counting the number of clock signals during the time gate. The time measured by the time interval meter 115 is proportional to the distance from the transmitting and receiving antennas of the present apparatus to the target. In other words, 254 $\mu$s corresponds to a distance of 3 meters and 2540 $\mu$s corresponds to a distance of 30 meters. Thus, by measuring such time, it is possible to measure the distance to a target to be detected. In addition, the present invention greatly differs from the ordinary radar system in that the time proportional to the distance is considerably expanded. In other words, to measure a distance of 3 meters by ordinary radar is to measure a time span of 20 ns ($20 \times 10^{-9}$ seconds). In accordance with the invention, however, to measure a distance of 3 meters is to measure a time span of 254 $\mu$s ($254 \times 10^{-6}$ seconds). The expansion ratio of the measured time is computed by substituting the frequencies $f_1 = 100.004$ MHz and $f_2 = 99.996$ MHz into equation (2) to obtain the following:

$$T_D = 12,500 \cdot \tau \qquad (4)$$

In other words, the time is expanded by a factor of 12,500 on the time base and it is only necessary to measure a very low speed signal. Therefore, the radar system according to the invention has great features in that the accuracy of short distance measurement is improved and the apparatus can be easily constructed with inexpensive low-speed element. The time measurement by the time-interval meter 115 is performed in response to the application of each time measurement start signal of a period of 15.875 ms. Thus, if the target is moved, a change in the distance from the transmitting and receiving antennas to the target can be detected at intervals of 15.875 ms. Also, with the time measurement according to the embodiment, 15.875 ms corresponds to a distance of about 188 meters. While the maximum detecting distance of 188 meters is sufficient in such applications as the ordinary underground search, by suitably selecting the clock frequencies $f_1$ and $f_2$, it is possible to change the expansion ratio on the time base and the maximum detecting distance.

Figure 7:
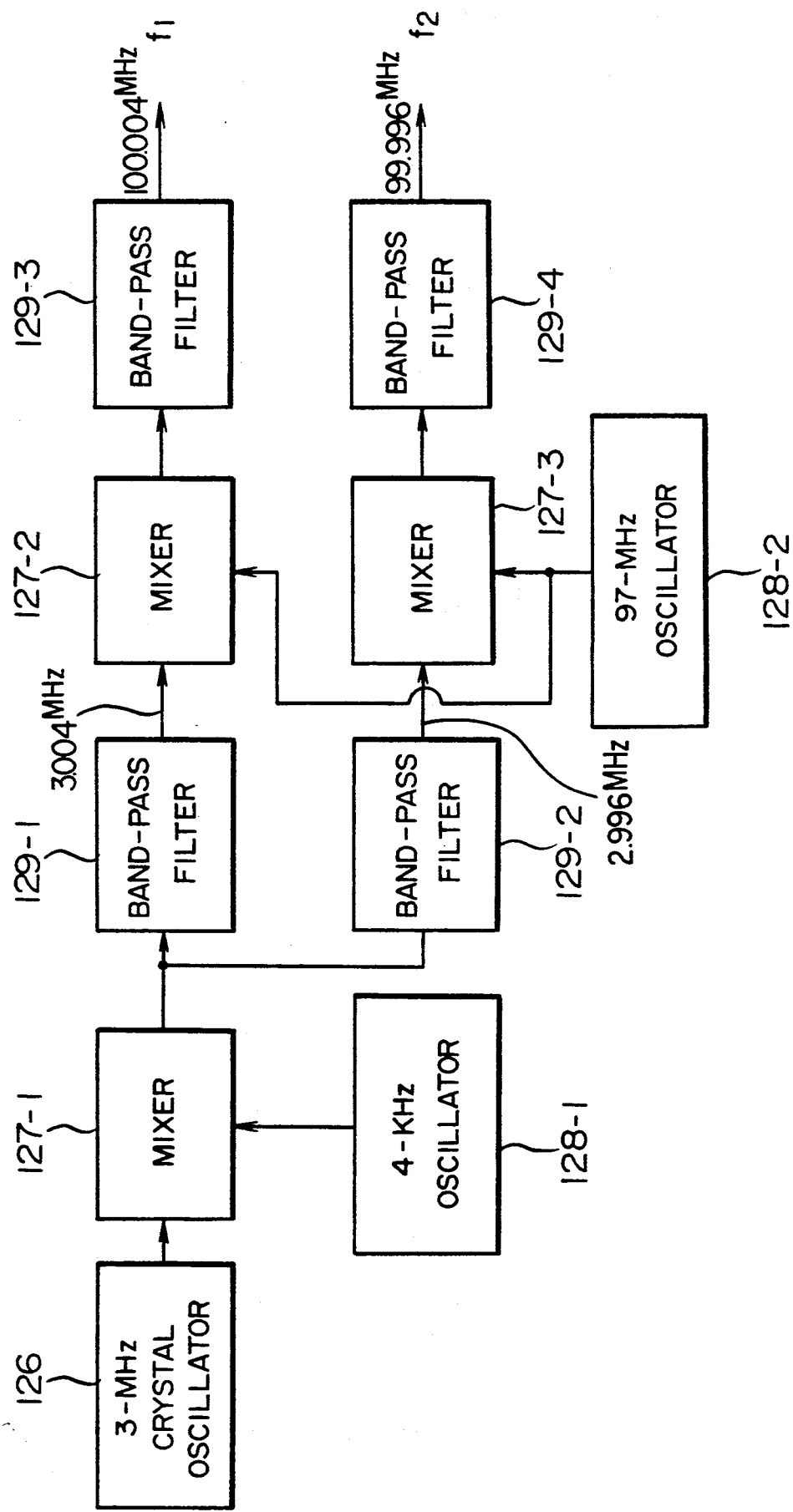
FIG. 7 is a block diagram showing an embodiment of the clock generator.

FIG. 7 shows a block diagram for an embodiment of the clock generator wherein numeral 126 designates a crystal oscillator having a frequency of 3 MHz, 127-1, 127-2 and 127-3 designate mixers each adapted to mix two signals of frequencies $f_A$ and $f_B$ to generate a signal of a sum frequency $f_A + f_B$ and a signal of a difference frequency $f_A - f_B$, 128-1 designates an oscillator having a frequency of 4 KHz, 128-2 designates an oscillator having a frequency of 97 MHz, and 129-1, 129-2, 129-3 and 129-4 designate band-pass filters respectively having selected pass frequencies of 3.004 MHz, 2.996 MHz, 100.004 MHz and 99.996 MHz.

The operation of the clock generator of FIG. 7 will now be described. The crystal oscillator 126 generates a 3 MHz signal and the oscillator 128-1 generates a 4 KHz signal. These signals are mixed by the mixer 127-1 comprising for example, a balanced modulator, thereby generating two signals of 3.004 MHz and 2.996 MHz, respectively. Of the output signals from the mixer 127-1, the 3.004 MHz signal is supplied to the mixer 127-2 through the band-pass filter 129-1 and the 2.996 MHz signal is supplied to the mixer 127-3 via the band-pass filter 129-2. The mixer 127-2 mixes the 3.004 MHz signal and the 97 MHz signal supplied from the oscillator 128-2 to generate their sum and difference signals, of which the sum signal or 100.004 MHz signal is passed through the band-pass filter 129-3 and generated as a clock frequency $f_1$. Similarly, the mixer 127-3 mixes the 2.996 MHz signal and the 97 MHz signal supplied from the oscillator 128-2 to generate its outputs, of which the sum signal or 99.996 MHz signal is passed through the band-pass filter 129-4 and generated as a clock frequency $f_2$. By virtue of this construction, the difference between the clock frequencies $f_1$ and $f_2$ is accurately maintained at 8 KHZ. In accordance with the invention, the two clock frequencies $f_1$ and $f_2$ are used to generate two pseudo random signals and the measurement is made by utilizing the difference in period between the pseudo random signals. Therefore, it is important to accurately maintain the difference between the clock frequencies for the improvement of the measuring accuracy. As a result, a clock signal generator capable of maintaining this frequency difference constant may be constructed using a PLL (phase-locked loop).

Figure 8:
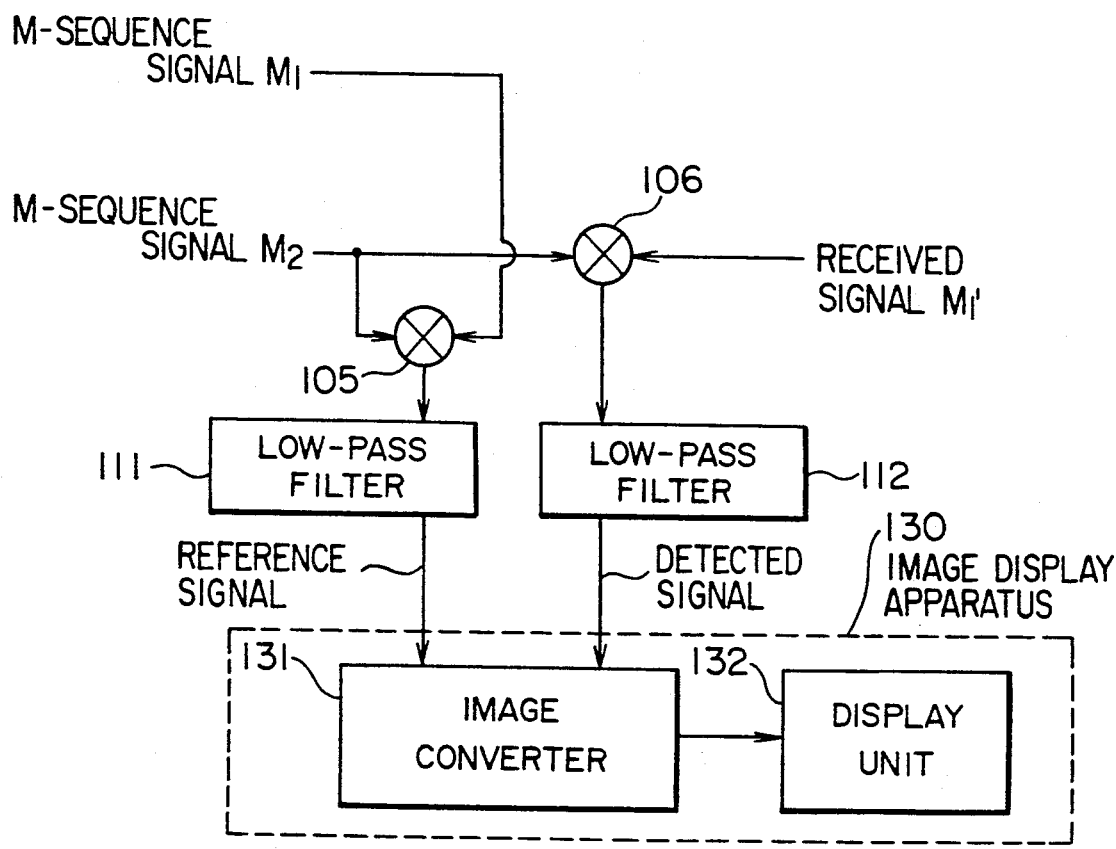
FIG. 8 is a block diagram of the image display system used with the first embodiment.

FIG. 8 shows a block diagram of an image display apparatus for displaying a detected signal according to the invention in the form of an image. In FIG. 8, numerals 105, 106, 111 and 112 designate the same component parts as shown in FIG. 1. Numeral 130 designates the image display apparatus incorporating an image converter 131 and a display unit 132. The image converter 131 uses the output signal from the low-pass filter 111 as a reference signal for distance measurement and the output signal from the low-pass filter 112 as a detected signal. Using the time interval between the reference signal and the detected signal as the position information of the corresponding distance, the detected signal is displayed as a dark or light image signal in accordance with the received intensity. If the transmitting and receiving antennas are moved, in response to the distance moved the scanning starting position is moved on the CRT display. In this respect, the apparatus features that the detected signal is sufficiently low in speed and it can be directly supplied to the image converter without passing through any sampling device as in the conventional case.

Figure 9:
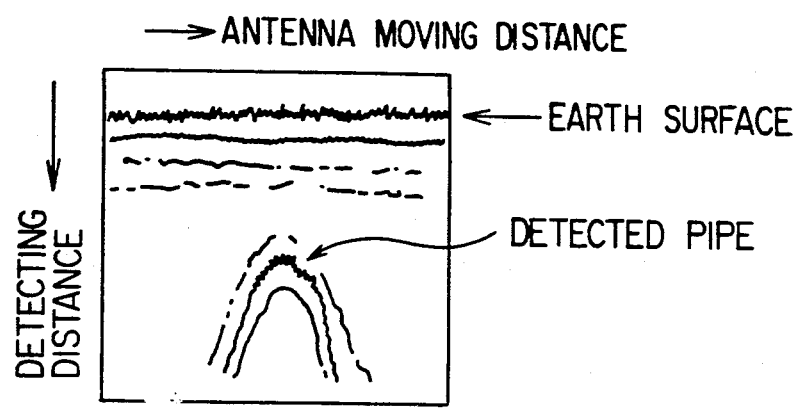
FIG. 9 is an image display diagram of a detected signal according to the first embodiment.

FIG. 9 shows an example of the display by image according to the invention of a detected signal of an underground object, e.g., a plastic pipe at a depth of 3 meters. In FIG. 9, the abscissa represents the moving distance of the transmitting and receiving antennas moved in a direction crossing the pipe and the ordinate represents the detecting distance. Also, the intensity of a detected signal is displayed in terms of the degree of light or shade. The upper part of a semi-circular waveform display opening downward indicates the detected pipe. This image of the semi-circular shape is due to the insufficient directivities of the transmitting and receiving antennas and this gives rise to no problem from the practical pipe detection point of view. Also, where the reflected wave from the ground surface is strong and the reflected wave from the target to be detected is weak, the method of separately moving the transmitting antenna and the receiving antenna to reduce the reflection from the ground surface is effective. The present invention is also available for underground survey such as geo-tomagraphy using bore-hole antennas which operate in two holes each and detect transmitted electromagnetic waves through the ground in addition to the reflected waves in the ground.

While the embodiment of the invention as applied to the underground or underwater searching radar has been described, the present invention is also applicable to distance measurement by a TDR (time domain reflector). The TDR is generally used for the purpose of detecting the faulty location of an electric wire or the like and an electric pulse in the form of a monopulse or step-formed pulse is input to one end of an electric wire. Thus, the electric pulse propagates and travels through the line so that it is returned to the signal input end by being reflected from the location of the changed characteristic impedance due to, for example, the disconnection or the short-circuiting of the line. The location of the changed characteristic impedance is detected in accordance with the time interval between the time of application of the electric pulse and the time of detection of the reflected signal and the propagation velocity of the entered electric signal in the line. Also, the TDR can be used for the detection of a fault point in an optical fiber by the use of a light pulse according to the same principle.

By applying the pseudo random signals according to the invention instead of applying the electric pulse signal to the TDR, the changed point of the characteristic impedance can be similarly detected in accordance with the time interval between the detection time of the start signal for time measurement and the time that the maximum correlation output between the reflected pseudo random signal and the reference pseudo random signal is obtained and the propagation velocity of the entered electric signal in the line. This method has a feature that even if any noise enters the reflected wave, the correlator is not caused to operate erroneously due to the noise, thereby ensuring stable measurement.

The distance measuring method and apparatus according to the second embodiment differ principally from the distance measuring method and apparatus according to the first embodiment in that instead of directly transmitting a first pseudo random signal, a spectrum spread signal obtained by phase modulating a carrier wave (e.g., an X-band wave having a frequency of about 10 GHz) by the first pseudo random signal is transmitted to a target to be detected and that after the processing of the correlation between the received wave and a second pseudo random signal, the received wave is subjected to coherent detection by coherent detecting means. The method of employing such a carrier wave has the purpose of meeting the object of the second embodiment, that is, to adapt it to a measuring method in which an electromagnetic wave is propagated in the air to measure the slag level or molten metal level in a melting reduction furnace, converter or the like.

In accordance with the distance measuring method and apparatus of a second embodiment, the first pseudo random signal and a second pseudo random signal which is identical in pattern but slightly different in frequency from the first pseudo random signal are respectively generated from first and second pseudo random signal generating means and, after the phase modulation of a carrier wave by the first pseudo random signal, the resulting spectrum spread signal is transmitted by transmitting means toward a target to be detected. A second multiplier performs the multiplication of a received signal obtained by receiving the reflected wave from the target by receiving means and the second pseudo random signal. When the received signal phase modulated by the first pseudo random signal and the second pseudo random signal are in phase the multiplication result obtained as an output of the second multiplier is the in-phase carrier wave and it is subjected to synchronization detection by the following coherent detecting means. This detected output is generated as a pulse-like target detection signal through detection signal generating means comprising a pair of low-pass filters, a pair of squaring devices and an adder.

However, while the first and second pseudo random signals are codes of the same pattern, the signal generating means are slightly different in frequency with the result that starting at the time that the two signals are in phase (that is, the correlation output between the two signals reaches a maximum), the two signals go out of phase with the passage of time so that there is no longer any correlation between the two pseudo random signals when the phase deviation becomes greater than one code. In this condition, the phase of the carrier wave obtained as the result of the multiplication of the received signal and the second pseudo random signal becomes random and the frequency band of the carrier wave is limited by the low-pass filter through which it passes after the synchronization detection by the coherent detecting means. Thus, no target detection signal is generated.

Then, as time passes further so that the phase deviation between the first and second pseudo random signals amounts to just one period of one of the pseudo random signals, the in-phase condition is again attained and the correlation output of the two signals reaches a maximum, thereby generating again a pulse-like target detection signal through the coherent detecting means and the detection signal generating means. As a result, this phenomenon is repeated at intervals of a given time and a periodic pulse-like signal is generated as a detected target signal.

On the other hand, it is necessary to establish a reference time for measuring the time interval between the reference time and the time of detection of a target detection signal from the received signal. This time reference signal is generated as a pulse-like signal of the same period as the target detection signal by directly multiplying the first and second pseudo random signals by a first multiplier and extracting the result of the multiplication or the time sequence pattern through a low-pass filter.

Therefore, since the time interval between the time of generation of the time reference signal and the time of generation of the target detection signal derived from the received signal represents an expanded value of the propagation time of the electromagnetic wave to go back and forth between the transmitting and receiving antennas and the target, the time interval between the two signals is converted into the distance between the transmitting and receiving antennas and the target.

The theoretic expressions of the first embodiment can be used as such as the theoretic expressions relating to the operating times of the second embodiment. The reason is that the second embodiment operates in time at the same times as the first embodiment excepting that in the second embodiment the signal of the modulated carrier wave is transmitted and the received signal is subjected to coherent detection after the correlation calculation. In other words, it is possible to apply equation (1) to a period $T_B$ at which a reference signal is generated, equation (2) to a measured time $T_D$ and equation (3) to the calculation of the distance x to a target to be detected.

In the distance measuring apparatus according to the second embodiment, the coherent detecting means of the carrier wave performs the operation of extracting a part of the output of transmitting carrier wave generating means by a first distributor, converting the extracted output into an in-phase component I and a quadrature component Q, dividing the carrier wave generated from the second multiplier into signals $R_1$ and $R_2$ through a second distributor, and generating as orthogonal detection signals a product $I \cdot R_1$ by a third multiplier and a product $Q \cdot R_2$ by a fourth multiplier.

In the distance measuring apparatus according to the second embodiment, a time difference measuring means for the time sequence pattern of the product by the first multiplier and the time sequence patterns of the orthogonal detection signals is designed so that a time-interval timer measures the interval of time between the time of generation of the maximum value of a pulse-like reference signal obtained by subjecting the output of the first multiplier to band limitation by the first low-pass filter and the time of generation of the maximum value of a pulse-like detection signal obtained by subjecting the products $I \cdot R_1$ and $Q \cdot R_2$ of the third and fourth multipliers to band limitation by the second and third low-pass filters, squaring the resulting signals by a pair of squaring devices and obtaining the sum of the resulting squared values by an adder.

The distance measuring apparatus according to the second embodiment is used in such a manner that after the apparatus has been arranged on a melting reduction furnace, converter or blast furnace, the transmitting and receiving antennas are inserted into the furnace through waveguides and the transmission and reception of an electromagnetic wave are effected, thereby effecting the measurement of such level as the slag level, molten steel level or charged raw material level.

Figure 10:
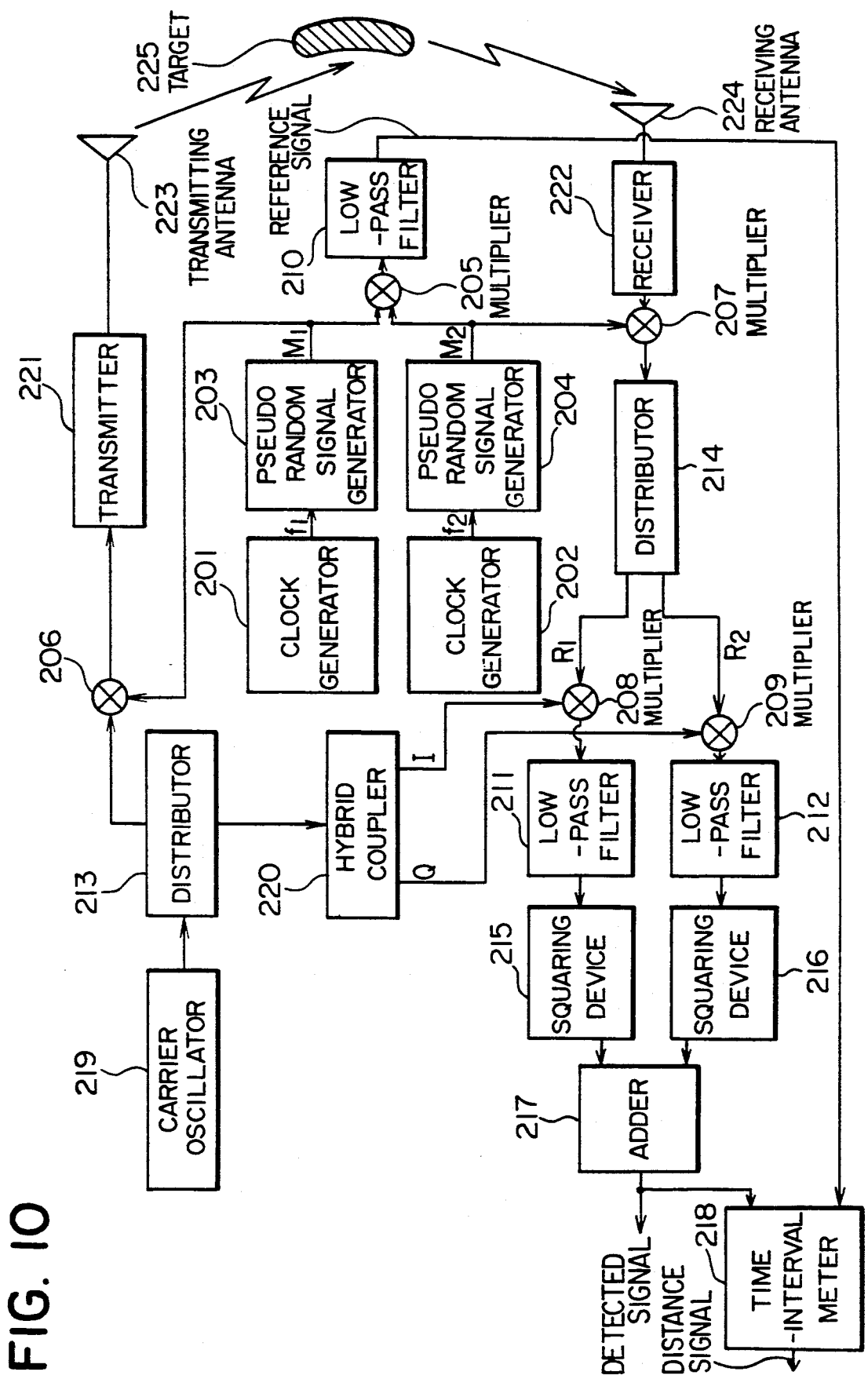
FIG. 10 is a block diagram showing a second embodiment of the invention.

Referring to the block diagram of FIG. 10 showing an example of the distance measuring apparatus according to the second embodiment, numerals 201 and 202 designate clock generators, 203 and 204 pseudo random signal generators, and 205 to 209 multipliers each composed, for example, of a double balanced mixer. Numerals 210 to 212 designate low-pass filters, 213 and 214 distributors, 215 and 216 squaring devices, 217 an adder, 218 a time-interval meter, 219 a carrier oscillator, 220 a hybrid coupler, 221 a transmitter, 222 a receiver, 223 a transmitting antenna, 224 a receiving antenna, and 225 a target.

FIG. 11 shows a plurality of signal waveforms useful for explaining the operation of the apparatus shown in FIG. 10.

The maximal length sequence signal generators 103 and 104 of FIG. 3 can be used as such for the pseudo random signal generators 203 and 204, respectively. Thus, in the description of FIG. 10, the pseudo random signal generators 203 and 204 will be explained as adapted to respectively generate 7-bit maximal length sequence signals $M_1$ and $M_2$. However, in addition to the maximal length sequence signals, Gold-sequence signals, JPL-sequence signals or the like may be used as the pseudo random signals. While, like the clock generators 101 and 102 of FIG. 3, the clock generators 201 and 202 each incorporate a crystal oscillator to generate clock signals of a sufficiently stable frequency, their generated frequencies are slightly different from each other. Thus, even in the case of FIG. 10, it is assumed that the generated frequencies $f_1$ of the clock generator 201 is 100.004 MHz and the generated frequency $f_2$ of the clock generator 202 is 99.996 MHz and that the frequency difference is $f_1 - f_2 = 8$ KHz. The clock signals $f_1$ and $f_2$ of the clock generators 201 and 202 are respectively supplied to the pseudo random signal generators 203 and 204. While there is a slight difference in the length of one period between the pseudo random signal generators 203 and 204 due to the frequency difference between their driving clock signals, they respectively generate maximal length sequence signals $M_1$ and $M_2$ of the same pattern. The output $M_1$ of the pseudo random signal generator 203 is applied to the multipliers 205 and 206 and the output $M_2$ of the pseudo random signal generator 204 is applied to the multipliers 205 and 207.

The carrier oscillator 219 generates, for example, a microwave having a frequency of about 10 GHz and its output signal is distributed by the distributor 213 so as to be supplied to the multiplier 206 and the hybrid coupler 220. The multiplier 206 is composed, for example, of a double balanced mixer which multiplies the carrier wave having a frequency of about 10 GHz applied from the distributor 213 and the maximal length sequence signal $M_1$ applied from the pseudo random signal generator 203 so that a spectrum spread signal resulting from phase modulation of the carrier wave is generated and supplied to the transmitter 221. The transmitter 221 power amplifies the applied spectrum spread signal, converts and radiates it as an electromagnetic wave to the target 225 through the transmitting antenna 223. It is to be noted that a electromagnetic wave of frequency 10 GHz has a wavelength of 3 cm in the air and it is sufficiently large as compared with the size (diameter) of dust within a steelmaking furnace, for example, thereby tending to be not easily affected by the dust, etc. Also, the transmitting antenna 223 and the receiving antenna 224 are each composed, for example, of a horn antenna and its directivity is sharply confined so as to reduce as far as possible the reflected power from other than the target to be measured. Then, the antenna gain is selected, for example, to be about 20 dB for each of these antennas. The electromagnetic wave radiated toward the target 225 from the transmitting antenna 223 is reflected by the target 225, converted to an electric signal through the receiving antenna 224 and applied to the receiver 222. The timing of supplying the input signal to the receiver 222 is of course delayed from the timing of the radiation of the electromagnetic wave from the transmitting antenna 233 by the time required by the electromagnetic wave to propagate back and forth the distance to the target 225 and reach the receiving antenna 224. The receiver 222 amplifies the input signal and then supplies it to the multiplier 207.

On the other hand, the maximal length sequence signals $M_1$ and $M_2$ respectively applied from the pseudo random signal generators 203 and 204 to the multiplier 205 are multiplied and the time sequence signal of the resulting product is supplied to the low-pass filter 210. FIG. 11(a) depicts the waveform showing the input signal to the low-pass filter 210, e.g., the time sequence signal or the product of the multiplier 205, and the waveform shows that an output voltage of +E is generated continuously while the two pseudo random signals are in phase and output voltages of +E and −E are generated randomly while the two signals are out of phase. Each of the low-pass filters 210 to 212 performs a frequency band limiting operation and hence a sort of integrating function, so that a pulse-like signal such as shown in FIG. 11(b) is generated as an integrated signal of the processed correlation value between the two signals while the two signals are in phase. On the contrary, the output of the low-pass filter is reduced to zero while the two signals are out of phase. Thus, a pulse-like signal is generated periodically at the output of the low-pass filter 210. This pulse-like signal is supplied as a time reference signal to the time-interval meter 218. The period $T_B$ of this reference signal can be computed from equation (1) as $T_B = 15.875$ ms since, in this embodiment, the wave number of one period of the maximal length sequence signals is $N = 127$ and the frequencies are $f_1 = 100.004$ MHz and $f_2 = 99.996$ MHz, the same as in the case of FIG. 3. This reference signal and its period $T_B$ are shown in FIG. 11(d).

Also, the received signal from the receiver 222 and the maximal length sequence signal $M_2$ from the pseudo random signal generator 204 are applied to the multiplier 207 to multiply the two signals. The output of the multiplier 207 is the in-phase carrier signal while the received signal of the transmitting carrier wave which was phase modulated by the first maximal length sequence signal $M_1$ and the second maximal length sequence signal $M_2$, are in phase whereas it is the carrier wave of a random phase while the the received signal and the maximal length sequence signal $M_2$, are out of phase and the carrier wave is supplied to the distributor 214. The distributor 214 distributes the input signal in two so that its distributed outputs $R_1$ and $R_2$ are respectively supplied to the multipliers 208 and 209. The hybrid coupler 220, which is supplied with a part of the transmitting carrier wave from the distributor 213, generates a signal I of the in-phase component (phase zero) and a signal Q of the quadrature component (phase quadrature) with respect to the input signal and the signals are respectively supplied to multipliers 208 and 209. The multiplier 208 multiplies the signal I applied from the hybrid coupler 220 (i.e., the signal which is in phase with the output of the carrier oscillator 219) and the signal $R_1$ applied from the distributor 214 and similarly multiplier 209 multiplies the input signals Q (i.e., the signal having a 90-degree phase difference with the output of the carrier oscillator 219) and $R_2$, thereby respectively extracting the in-phase component ($I \cdot R_1$) and the phase quadrature component ($Q \cdot R_2$) of the received signal and generating them as orthogonal detection signals. The orthogonal detection signals $I \cdot R_1$ and $Q \cdot R_2$ are respectively supplied to the low-pass filters 211 and 212 performing band limitation of the same frequency range as the low-pass filter 210. Each of low-pass filters 211 and 212 performs a frequency band limiting operation and hence an integrating function and thus it integrates the processed correlation value of the two signals. In other words, when the signal $R_1$ applied to the multiplier 208 from the multiplier 207 through the distributor 214 and the signal I applied to the multiplier 208 from the hybrid coupler 220 are in phase and similarly when the signals $R_2$ and Q applied to the multiplier 209 are in phase, the output signals of the multipliers 208 and 209 take the form of pulse signals of a constant polarity (pulse signals of voltage +E) and the signals are respectively integrated by the low-pass filters 211 and 212, thereby generating large positive voltages at their outputs. On the contrary, if the signals $R_1$ and I are out of phase and if the signals $R_2$ and Q are out of phase, the output signals of the multipliers 208 and 209 take the form of pulse signals of randomly varying positive and negative polarities (i.e., pulse signals of the voltages +E and −E) and these signals are respectively integrated by the low-pass filters 211 and 212, thereby generating no outputs. After having been integrated by the low-pass filters 211 and 212 in this way, the in-phase component signal and the phase quadrature component signal are respectively supplied to the squaring devices 215 and 216. Each of the squaring devices 215 and 216 squares the amplitude of the input signal and supplies the resulting output signal to the adder 217. The adder 217 adds the two input signals so that a pulse-like detected target signal such as shown in FIG. 11(c) is generated and supplied to the time-interval meter 218. Assume now that the maximum value of this detected target signal occurs at a time $t_b$. While the described method comprising the steps of detecting the in-phase component and the phase quadrature component of the transmitting carrier wave from the signal obtained by a correlation process on the received signal and the maximal length sequence signal $M_2$, squaring the orthogonal detection signals after the integration thereof and generating a detected target signal as the sum of the pair of squared values is more or less complicated in construction, the method can produce a detected target signal of a high degree of sensitivity. Also, due to the production of the correlation output of the pseudo random signals such as maximal length sequence signals, the effect of noise is reduced and the signals are enhanced, thereby realizing a measuring system having a high signal-to-noise (S/N) ratio. As regards the carrier detecting method, there is of course a detecting method employing a crystal which, although low in sensitivity, is simplified in construction and this method may be used depending on the specification and cost.

The time-interval meter 218 measures the time interval $T_D$ between the time $t_a$ of generation of the maximum value of the reference signal applied from the low-pass filter 210 and the time $t_b$ of generation of the maximum value of the detected target signal applied from the adder 217. For this purpose, the time-interval meter 218 has a function of detecting the maximum value generation times of the two input signals. For instance, the input voltage value is successively sampled and held by clock signals in such a manner that the sampled value by the current clock signal and the sampled value by the preceding clock signal are successively compared by a voltage comparator and the time of transition from the positive-going to the negative-going condition of the input signal is detected, thereby detecting the time of generation of the maximum value of the input signal. The time interval $T_D$ is shown as the interval of time between the time $t_a$ of generation of the maximum value of the reference signal shown in FIG. 11(d) and the time $t_b$ of generation of the maximum value of the detected signal shown in FIG. 11(c). As shown by equation (2), the time interval $T_D$ is obtained in an expanded form in time as $f_1/(f_1-f_2)$ times the propagation time $\tau$ actually required for the electromagnetic wave to go back and forth the distance between the transmitting and receiving antennas 223 and 224 and the target 225. In the case of this embodiment, $f_1 = 100.004$ MHz and $f_2 = 99.996$ MHz so that in accordance with equation (4), the measured time $T_D$ is expanded in time to 12,500 times the wave propagation time $\tau$. The measured time $T_D$ is obtained at intervals of the period $T_B$ of the reference signal.

It will thus be seen that in accordance with this embodiment the measured time is expanded very greatly and the distance to any target can be measured accurately even if the distance is short. Therefore, the embodiment is suitable as a short-distance level measuring apparatus for measuring, for example, the slag level or molten steel level in a furnace.

Therefore, by determining the distance of x meters from the transmitting and receiving antennas 223 and 224 to the target 225 from equation (3), we obtain the following:

$$x = (f_1 - f_2)/2f_1 \cdot V \cdot T_D = 1.2 \times 10^4 \cdot T_D \qquad (5)$$

Figure 12:
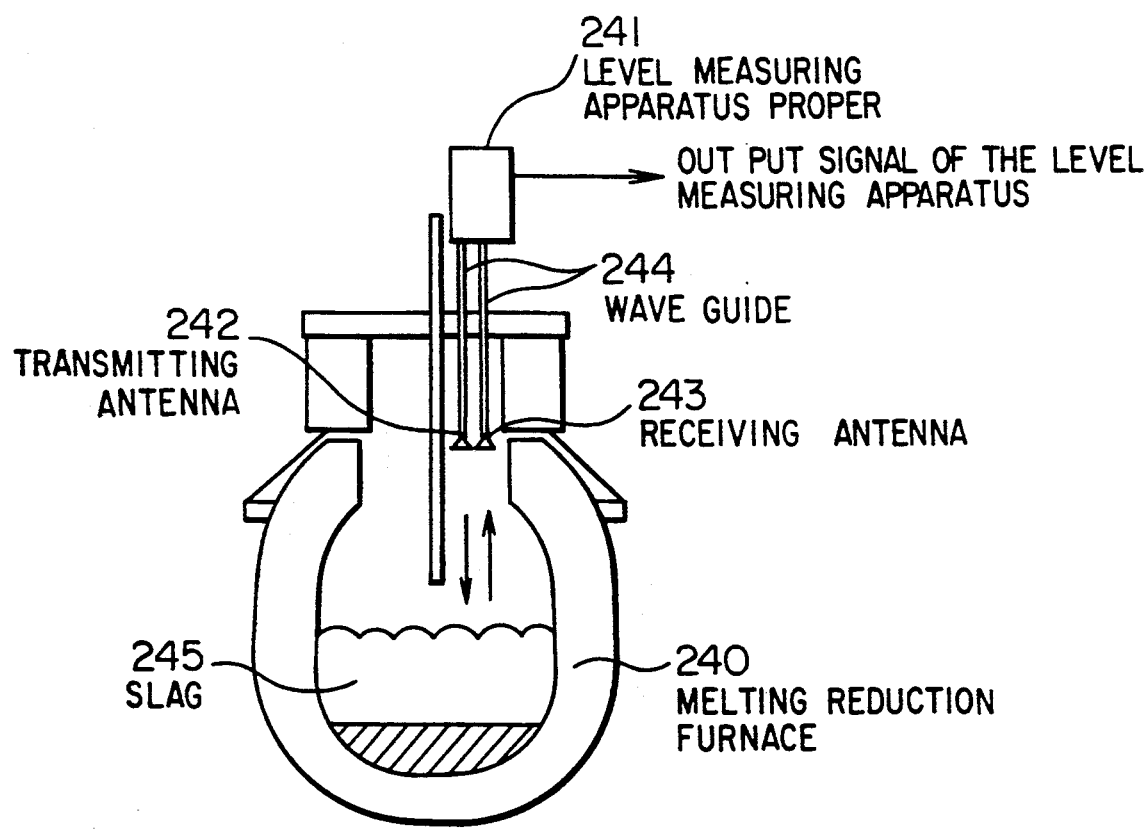
FIG. 12 is a diagram showing the second embodiment incorporated in an apparatus for measuring the slag level within a melting reduction furnace.

Referring now to FIG. 12, there is illustrated a schematic diagram showing the second embodiment of the invention which is applied to an apparatus for measuring the slag level in a melting reduction furnace. In the figure numeral 240 designates a melting reduction furnace, 241 a level measuring apparatus proper, 242 a transmitting antenna, 243 a receiving antenna, 244 waveguides, and 245 slag. The transmitting and receiving antennas 242 and 243, which are installed inside the furnace, are composed of water-cooled horn antennas and are connected through the waveguides 244 to the level measuring apparatus 241 disposed at the top of the melting reduction furnace 240. The level of the slag 245 within the furnace is obtained by transmitting an electromagnetic wave from the level measuring apparatus 241 through one of the waveguides 244 and the transmitting antenna 242, receiving the electromagnetic wave reflected from the surface of the slag 245 through the receiving antenna 243 and the other of the waveguides 244 and then substituting the previously mentioned measured time $T_D$ into equation (5) for computation. Actually, the measured value of the level measuring apparatus according to the present embodiment showed a satisfactory coincidence with the measurement result obtained by measuring the position of slag deposition on the sublance.

In addition, in a measuring environment tending to cause any undesired reflected wave, e.g., the limited space in a furnace, in accordance with this embodiment the advantage of the greatly expanded time for measuring the distance to the target is utilized in such a manner that only the detected signal due to the desired reflected wave is extracted through a time gate circuit and the detected signals due to the undesired reflected waves are eliminated, thereby stably measuring the desired level position or distance.

While, in this disclosed embodiment, the transmitting and receiving antennas comprise two separately arranged antennas, the invention is not limited thereto and the antenna system may be designed so that a single antenna is used as a common transmitting and receiving antenna and a directional coupler or duplexer is added to separate a transmitted signal from a received signal.

Further, while the present embodiment has been described as applied for level measuring purposes, by suitably selecting clock frequencies for generating two pseudo random signals, the embodiment can be satisfactorily applied to the distance measurement of ordinary targets, including long-distance ones, such as, flying targets, ships and automobiles.

Still further, while in this embodiment the carrier wave comprises a microwave of about 10 GHz by way of example, it is also possible to use a millimeter wave, light, a sound wave, an ultrasonic wave an acoustic wave as the carrier wave.

Still further, the apparatus may be additionally provided with a clock to compute a change of the measured distance of a target in unit time so as to measure the speed of the target.

What is claimed is:

1. A distance measuring method comprising the steps of:

generating a first pseudo random signal having a clock frequency $f_1$;

transmitting said first pseudo random signal toward a target as an electromagnetic wave signal;

receiving a signal reflected from said target and obtaining a received signal;

generating a second pseudo random signal which is the same in pattern as said first pseudo random signal but having a clock frequency $f_2$ which is slightly different from said clock frequency $f_1$;

multiplying said first pseudo random signal by said second pseudo random signal to make a first product;

multiplying said received signal by said second pseudo random signal to make a second product;

obtaining a first smoothed signal by passing said first product through a first low-pass filter;

obtaining a second smoothed signal by passing said second product through a second low-pass filter;

generating a first pulse when the value of said first smoothed signal reaches a maximum;

generating a second pulse when the value of said second smoothed signal reaches a maximum;

measuring the time interval between the point when said first pulse is generated and the point when said second pulse is generated, multiplying one half of said time interval by the propagation velocity of said electromagnetic wave to form a first operation value as the product of said multiplication, dividing the frequency difference between said clock frequencies $f_1$ and $f_2$ by said clock frequency $f_1$ to form a second operation value as the quotient of said division and multiplying said first operation value by said second operation value to calculate the distance to said target as the product of said multiplication.

2. A distance measuring apparatus comprising:

means for generating a first pseudo random signal having a clock frequency $f_1$;

means for transmitting an output of said first pseudo random signal generating means as an electromagnetic wave signal toward a target;

receiving means for receiving a reflected signal from said target to obtain a received signal;

means for generating a second pseudo random signal which is the same in pattern as said first pseudo random signal but having a clock frequency $f_2$ which is slightly different from said clock frequency $f_1$;

a first multiplier for multiplying the output of said first pseudo random signal generating means by an output of said second pseudo random signal generating means;

a second multiplier for multiplying an output of said receiving means by the output of said second pseudo random signal generating means;

a first low pass filter for smoothing the output of said first multiplier and outputting a first smoothed signal;

a second low pass filter for smoothing the output of said second multiplier and outputting a second smoothed signal;

first pulse generating means for generating a pulse when the first smoothed signal from said first low pass filter reaches a maximum;

second pulse generating means for generating a pulse when the second smoothed signal obtained from said second low pass filter reaches a maximum;

measuring and calculating means for measuring the time interval between the point when said first pulse is generated and the point when said second pulse is generated, multiplying one half of said time interval by the propagation velocity of said electromagnetic wave to form a first operation value as the product of said multiplication, dividing the frequency difference between said clock frequencies $f_1$ and $f_2$ by said clock frequency $f_1$ to form a second operation value as the quotient of said division and multiplying said first operation value by said second operation value to calculate the distance to said target as the product of said multiplication.

3. A distance measuring apparatus according to claim 2 wherein:

said first pseudo random signal generating means comprises a first clock generator having the clock frequency $f_1$ and a first clock-synchronizing type pseudo random signal generating means to be driven by an output of said first clock generator;

said second pseudo random signal generating means comprises a second clock generator having the clock frequency $f_2$ and a second clock-synchronizing type pseudo random signal generating means to be driven by an output of said second clock generator;

said first clock-synchronizing type pseudo random signal generating means has the same construction as that of said second clock-synchronizing type pseudo random signal generating means; and the clock frequency $f_1$ of said first clock generator is slightly different from the clock frequency $f_2$ of said second clock generator.

4. A distance measuring method comprising the steps of:

generating a first pseudo random signal having a clock frequency $f_1$;

generating a second pseudo random signal which is the same in pattern as said first pseudo random signal but having a clock frequency $f_2$ which is slightly different from said clock frequency $f_1$;

multiplying said first pseudo random signal by said second pseudo random signal and outputting the correlated code signal as the product of said multiplication;

generating a reference carrier wave;

modulating said reference carrier wave in coded phase by each code of said first pseudo random signal;

transmitting said modulated carrier wave in coded phase toward the target as an electromagnetic wave signal;

receiving a signal reflected from said target to obtain a received signal;

multiplying said received signal by said second pseudo random signal and outputting the phase correlated carrier wave as the product of said multiplication;

respectively multiplying said phase correlated carrier wave by an inphase component (I signal) and by a quadrature component (Q signal) which are extracted from said reference carrier wave, their phases being mutually orthogonal, and respectively outputting both products, the real part and the imaginary part of the orthogonal detected signal;

respectively smoothing said real part and imaginary part of said orthogonal detected signal and calculating the signal absolute value of a composed detection signal from said smoothed two component signals;

passing said correlated coded signal through a low pass filter and outputting the smoothed correlated coded signal;

measuring the time interval between point when said smoothed correlated code signal value reaches a maximum and the point when said signal absolute value of a composed detection signal reaches a maximum, multiplying one half of said time interval by the propagation velocity of said electromagnetic wave to form a first operation value as the product of said multiplication, dividing the frequency difference between said clock frequencies $f_1$ and $f_2$ by said clock frequency $f_1$ to form a second operation value as the quotient of said division and multiplying said first operation value by said second operation value to calculate the distance to said target as the product of said multiplication.

5. A distance measuring apparatus comprising:

means for generating a first pseudo random signal having a clock frequency $f_1$;

means for generating a second pseudo random signal which is the same in pattern as said first pseudo random signal but having a clock frequency $f_2$ which is slightly different from said clock frequency $f_1$;

a first multiplier for multiplying the output of said first pseudo random signal generating means by the output of said second pseudo random signal generating means and outputting the correlated code signal as the product of said multiplication;

carrier wave generating means for generating a reference carrier wave;

modulating means for modulating the output of said carrier wave generating means in coded phase by each code signal of said first pseudo random signal generating means;

transmitting means for transmitting the output of said modulating means toward the target as an electromagnetic wave signal;

receiving means for receiving a reflected signal from said target to obtain a received signal;

a second multiplier for multiplying an output of said receiving means by the output of said second pseudo random signal generating means and outputting the phase correlated carrier wave as the product of said multiplication;

multiplying said first operation value by said second operation value to calculate the distance to said target as the product of said multiplication.

6. A distance measuring apparatus according to claim 5, wherein said orthogonal signal detecting means comprises:

a first distributor for extracting a part of the output of said carrier wave generating means;

a hybrid coupler for receiving an output of said first distributor and converting the same to generate said I signal and Q signal wherein their phases are mutually orthogonal;

a second distributor for dividing said phase correlated carrier wave outputted from said second multiplier into an $R_1$ signal and an $R_2$ signal;

a third multiplier for multiplying the I signal outputted from said hybrid coupler by the $R_1$ signal outputted from said second distributor; and a fourth multiplier for multiplying the Q signal outputted from said hybrid coupler by the $R_2$ signal outputted from said second distributor.

7. A distance measuring apparatus according to claim 6, wherein said signal absolute value calculating means comprises:

a second low-pass filter and a third low-pass filter for respectively receiving the the real part and the imaginary part of the orthogonal detected signal outputted from said orthogonal signal detecting means and subjecting them to band limitation of the same frequency range as said first low-pass filter;

first and second squaring devices for respectively receiving the output of each of said second and third low-pass filters and separately performing a squaring operation thereon; and an adder for adding the outputs of said first and second squaring devices.

8. A distance measuring apparatus according to claim 7, wherein said distance measuring apparatus is arranged on an upper part of either one of a melting reduction furnace, converter and blast furnace to measure any one of a slag level, molten steel level and charged raw material level.

9. A distance measuring apparatus according to claim 6, wherein said distance measuring apparatus is arranged on an upper part of either one of a melting reduction furnace, converter and blast furnace to measure any one, of a slag level, molten steel level and charged raw material level.

10. A distance measuring apparatus according to claim 5, wherein said signal absolute value calculating means comprises:

a second low pass filter and a third low-pass filter for respectively receiving the real part and the imaginary part of the orthogonal detected outputted from said orthogonal signal detecting means and subjecting them to band limitation of the same frequency range as said first low-pass filter;

first and second squaring devices for respectively receiving the output of each of said second and third low-pass filters and separately performing a squaring operation thereon; and an adder for adding the outputs of said first and second squaring devices.

11. A distance measuring apparatus according to claim 10, wherein said distance measuring apparatus is arranged on an upper part of either one of a melting reduction furnace, converter and blast furnace to measure any one of a slag level, molten steel level and charged raw material level.

12. A distance measuring apparatus according to claim 5, wherein said distance measuring apparatus is arranged on an upper part of either one of a melting reduction furnace, converter and blast furnace to measure any one of a slag level, molten steel level and charged raw material level.

* * * * *